United States Patent [19]
Anderson et al.

[11] 3,956,615
[45] May 11, 1976

[54] TRANSACTION EXECUTION SYSTEM WITH SECURE DATA STORAGE AND COMMUNICATIONS

[75] Inventors: Thomas G. Anderson, Los Altos; William A. Boothroyd; Richard C. Frey, both of San Jose, all of Calif.

[73] Assignee: IBM Corporation, Armonk, N.Y.

[22] Filed: June 25, 1974

[21] Appl. No.: 483,084

[52] U.S. Cl. .................. 235/61.7 B; 235/61.11 D; 340/149 A; 340/152 R
[51] Int. Cl.² ................. H04Q 9/00; G06K 7/00
[58] Field of Search ............. 235/61.7 B, 61.11 D, 235/61.11 E; 340/149 A, 152 R

[56] References Cited
UNITED STATES PATENTS

| | | | |
|---|---|---|---|
| 3,641,497 | 2/1972 | Constable | 340/149 A |
| 3,715,569 | 2/1973 | Hicks et al. | 235/61.11 D |
| 3,743,134 | 7/1973 | Constable et al. | 235/61.11 D |
| 3,833,885 | 9/1974 | Gentile et al. | 340/152 R |
| 3,845,277 | 10/1974 | Voss et al. | 235/61.7 B |

*Primary Examiner*—Vincent P. Canney
*Attorney, Agent, or Firm*—Fraser and Bogucki

[57] ABSTRACT

A transaction execution system includes a host data processing system having a multiple account data base and a plurality of transaction terminals in communication with the host. The terminals each include a keyboard, a display, document handling subsystems, a hardware control subsystem, a communication subsystem and a programmable control subsystem supervising the other subsystems. A user initiates a transaction request by inserting a card into one of the terminals. After reading acceptable account identification information from the card the terminal requests entry of a preassigned personal ID number through the keyboard. The ID number is encrypted by the terminal at least once and communicated to the host along with information read from the card and entered via the keyboard. The host accesses from its stored data base an encrypted ID number corresponding to the received card information and makes a verification comparison of the stored encrypted ID number with the encrypted ID number received from the terminal. By requiring the entry of a nonencrypted ID number at a terminal while storing only encrypted ID numbers at the host, the correspondence between credit card account information and ID numbers need be known only to a few key personnel having access to both the encryption algorithm and a particular key therefor.

28 Claims, 5 Drawing Figures

1

TRANSACTION EXECUTION SYSTEM WITH SECURE DATA STORAGE AND COMMUNICATIONS

CROSS REFERENCE TO RELATED APPLICATIONS

This application is related to the following patent applications which are concurrently filed herewith and assigned to a common assignee:
1. "TRANSACTION TERMINAL WITH UNLIMITED RANGE OF FUNCTIONS", Ser. No. 483,058, filed June 25, 1974, by William A. Boothroyd et al.
2. "MODULAR TRANSACTION TERMINAL WITH MICROPROCESSOR CONTROL", Ser. No. 482,860, filed June 25, 1974, by William A. Boothroyd.

BACKGROUND OF THE INVENTION

1. Field of the Invention

This invention relates to transaction execution systems and more particularly to secure transaction execution systems having a central data base in communication with remote terminals which permit the execution of transactions such as the issuance of cash or the interaccount transfer of funds.

2. History of the Prior Art

For reasons of public convenience and economy a variety of systems have been developed for executing user requested transactions. One example is a check cashing machine. Such a machine reads data from a check inserted therein and issues cash equal to the amount of the check if the check is found to be in order. Other systems have been developed for use in conjunction with credit cards.

One credit card system stores credit card account information in a central data base. In response to the submission of an account number from a remote terminal, the system provides information relating to the account. For instance, the system may indicate that the card has expired, that it has been stolen or may indicate the dollar amount of available credit. After a transaction is completed the system properly adjusts the stored information to account for the transaction.

Other credit card systems, which are frequently used by banks to extend their services during times of heavy business or business closure, permit the issuance of cash or the receipt of deposits through a terminal. Such a terminal typically includes a mechanism for receiving and reading information from a credit card, a keyboard, a display and document entry and exit apertures. The terminal may operate in conjunction with a data base or as a stand alone unit. Increased security for the issuance of cash without human intervention is attained by issuing a personal ID number with each credit card. A credit card transaction is then enabled only when an ID number corresponding to the account number read from the credit card is entered through the keyboard. This required correspondence prevents a thief or mere finder of a credit card from receiving cash from a terminal. If a terminal operates in conjunction with a data base the correspondence between account numbers and ID numbers can be chosen at random, but frequently the ID number is derivable from the account number in accordance with a predetermined code. This predetermined relationship permits a stand alone terminal to check the ID number by algorithmically relating the ID number to the account number.

While this dual credit card and ID number identification technique improves the security of cash issue terminals, there are still weaknesses that may be exploited to gain access to the large amounts of cash that are stored in the terminals. For instance it may be necessary to employ a substantial number of computer operators, programmers, analysts and other people at the host data base who have at least limited access to information stored in the host data base. It would be possible for any of these people to compile lists of account numbers and corresponding ID numbers to be used in conjunction with forged or stolen credit cards to obtain cash.

An equally serious problem relates to the security of the encryption algorithm for terminals which are capable of stand alone operation. A large number of operators or maintenance personnel are required for the day-to-day support of cash issue terminals. For example, one or two people at each branch bank location may have internal access to the cash issue terminals. Often times these people may have access to the encryption key for normal maintenance. Alternatively, with only a little training these people could learn to acquire the key by measuring electrical signals on the internal circuitry. Once the encryption key is acquired, a correspondence between a large number of account numbers and ID numbers could be generated.

Another possible security problem arises from the transmission of account information and ID information between a terminal and a host data base. These transmissions often involve utility communication lines and are therefore subject to monitoring by a large number of people. Encryption is often used to improve communication security but anyone who is able to break the code or gain access to the code would be able to extract and compile a list of correspondence between credit card account information and ID numbers by monitoring these transmissions. In addition, by generating fake terminal communication traffic a person might gain access to the host data base and fraudulently transfer funds within data base accounts. Thus, while protected against a common thief, conventional systems which use this dual identification technique are not adequately protected against a sophisticated thief having knowledge of modern data processing equipment.

SUMMARY OF THE INVENTION

A transaction execution system in accordance with the invention includes a host data processing system having a data base of stored information for many accounts and a plurality of transaction terminals. The host operates to approve or disapprove indicated transactions, to properly account for executed transactions and provide support information for the terminals. The transaction terminals are operatively stand alone units which are connected for communication with the host from scattered locations. Each terminal includes a document handling subsystem for cash or transaction statements, a credit card reading subsystem, a host communication subsystem, a user communication subsystem, and an operational control subsystem including a programmable microprocessor.

The document handling subsystem includes a cash storage mechanism, a transport mechanism for issuing cash to a user under the supervision and control of the microprocessor and a transaction statement dispenser issuing printed statements under control of the microprocessor. The credit card reading subsystem operates under control of the microprocessor to receive and read user credit cards which may be either returned or retained after the processing of a transaction request. The host communication subsystem provides an interface for the proper transmission of information between a terminal and a host in accordance with predetermined communication formats. The user communication subsystem operates in response to the microprocessor to control user access to the terminal and includes a keyboard receiving user commands and a display interactively providing user guidance.

A user wishing to execute a transaction must insert a credit card into a terminal and then enter personal ID and transaction request information through the keyboard. The terminal then optionally encodes a selected portion of the credit card information using a first encryption key to obtain encrypted ID information which may be tested for correspondence with a selected portion of the keyboard entered ID information. In the absence of a predetermined correspondence the transaction is terminated, the host is informed via a message and the host reply defines the action against the card which is selectively returned or retained. If correspondence is found, the entered ID information is encoded using a second encryption key which may be the same as the first encryption key. The encrypted ID information is combined with variable information such as a sequential transaction number or cash count to prevent repetitive transmission of identical encryption fields and then encoded again using a third transmission key. This encryption process allows the host data base to have stored not the ID number, but only an encrypted ID number. The data base is thus secured against the surreptitious extraction of an account number and ID number correspondence list from which counterfeit cards could be created. The encrypted ID information is combined with clear text request and credit card information and is then communicated to the host data processing system. A three part transaction execution sequence begins with a transaction request message which provides the host with the encrypted ID number, which is combined with variable data and reencrypted, credit card information and transaction request information entered through the keyboard. For example, the user might request the issuance of $100 from his credit card account. Upon receipt of a request the host checks for correspondence between the transmitted encoded ID number and the encoded ID number stored in its data base, checks for account restrictions such as a maximum credit limit, and if everything is in order transmits a reply message authorizing the transaction. If all is not in order the host disapproves the requested transaction.

Like the request message, the subsequent reply message includes an encrypted portion containing an action command and variable data such as a cash count number or a transaction number. After the encoded information is combined with clear text information such as transaction statement information and display information the reply message is sent to the requesting terminal.

Upon receipt by the requesting transaction terminal of the transaction reply message, the terminal decrypts, checks the accuracy of the variable data to insure against error and then executes the commanded actions. The terminal then generates a status message to inform the host of the execution or cancellation of the transaction and of any error conditions at the terminal. An encrypted portion of the status message includes the transaction number, the number of status bytes in the message and the cash counter status. The host responds by properly accounting for the indicated transaction by recording the transaction or updating the data base. If an error condition is indicated the host may transmit a command message to attempt to correct the error or close the terminal if the error cannot be corrected. Use of this data message technique makes the encryption keys very difficult to break and provides a communication redundancy to insure that the host and a terminal are responding to correct messages. In addition, the correspondence between personal ID numbers and account numbers is protected by an encryption scheme that avoids the necessity of storing both in the host data base.

BRIEF DESCRIPTION OF THE DRAWINGS

A better understanding of the invention may be had from a consideration of the following detailed description taken in conjunction with the accompanying drawings in which.

DETAILED DESCRIPTION

Table of Contents

Figure 1:
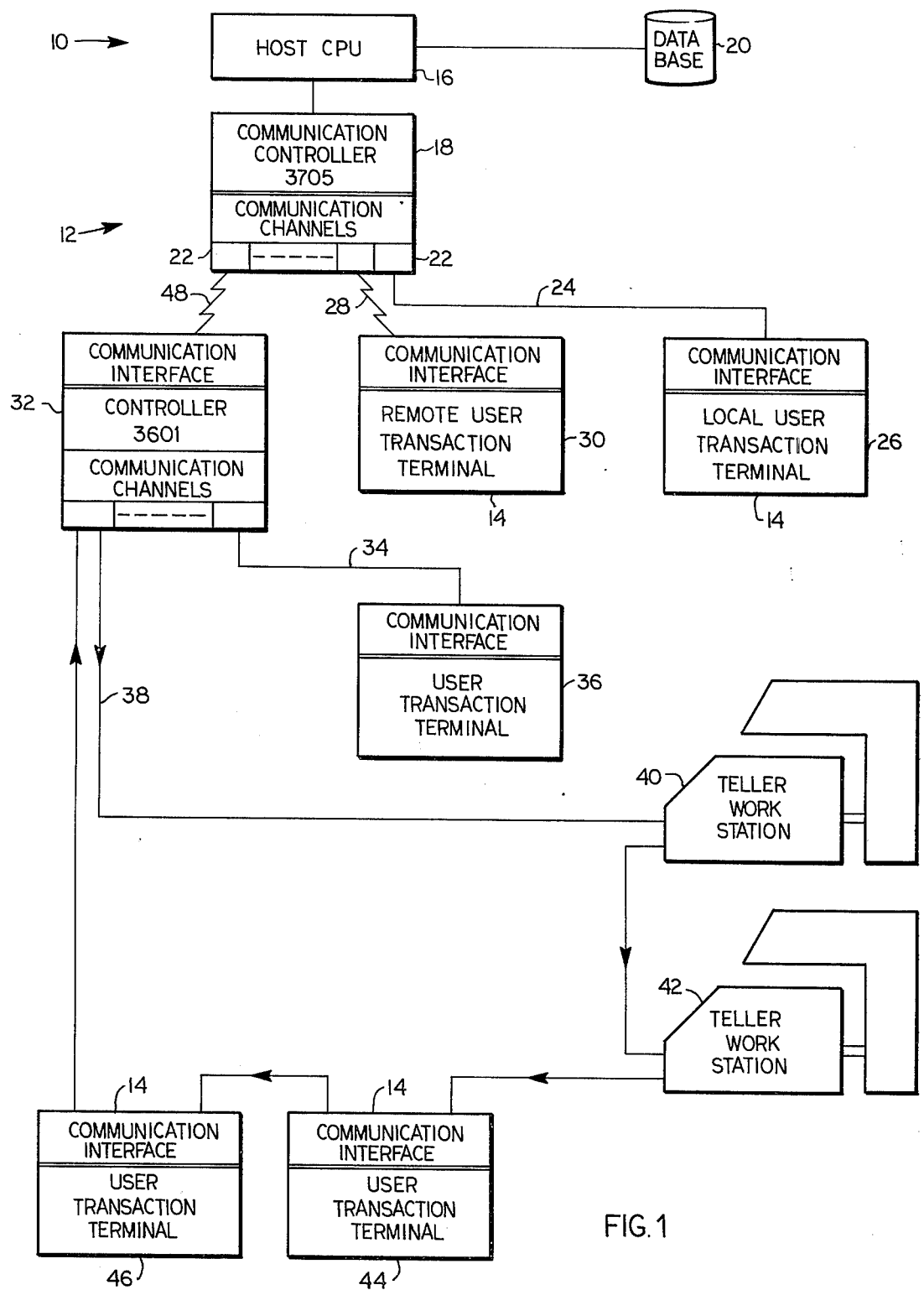
FIG. 1 is a functional block diagram representation of a transaction execution system in accordance with the invention.

Transaction Execution Terminal
Terminal Information Bus
Processor Support Subsystem
Mechanical Control Subsystem
User Communication Subsystem
Transaction Statement Dispenser Subsystem
Operator Function Subsystem
Communication Subsystem
Remote Connector
Communication Message Format
Transaction Message Assembly
  1. Transaction Request Message
  2. Transaction Reply Message
  3. Execution and Status Message

INTRODUCTION

A transaction execution system 10 in accordance with the invention includes a host data processing system 12 and a plurality of user transaction terminals 14 in communication therewith. The host data processing system 12 includes a host central processing unit 16 such as an IBM system 370, a communication controller 18 such as an IBM 3705 and a data base 20 which may include electrically alterable random access memory, magnetic tape transports, and magnetic disks. The host CPU performs the arithmetic and logical operations which are required for controlling the operation of the host data processing system 12 and processing information which is received through the communication controller 18 or stored in the data base 20. The data base 20 stores information which is related to each customer of the host central processing system 12. For instance, for a banking customer, the data base might store account information for credit card, savings, checking or other accounts of the bank as well as payroll information and information relating to the financial status of the bank's operations. Each account might be typically addressable in accordance with an account number and have stored therein the current account information such as the current balance, a history of account transactions for a predetermined period of time, encoded personal ID numbers for persons who are authorized to use the account, a maximum credit limit, and any other information the bank may wish to store as part of an account. The communication controller 18 acts as an interface between the CPU 16 and a plurality of communication channels 20. The controller 18 arranges information received by the host 16 into a communication discipline and maintains communication synchronization.

A transaction terminal 14 may be connected for communication with the host data processing system 12 in an almost unlimited number of ways with the various methods shown in FIG. 1 being only exemplary. For instance, a terminal may be connected directly to the communication controller 18 by either a local communication link such as cable 24 for local user transaction terminal 26 or a utility or radio link 28 for a remote user transaction terminal 30. Alternatively, a terminal may be connected to the host central processing system 12 through a controller 32 such as an IBM 3601 by either direct connection to the controller 32 as by cable 34 for terminal 36 or by connection in a communication loop 38. Although other devices may be included, the communication loop 38 is illustrated by way of an example as including a first teller work station 40, a second teller work station 42, a first user transaction terminal 44 and a second user transaction terminal 46. While the communication loop 38 may include remote transmission links such as radio communication or communication over commercial utility lines, for a bank system, the controller 32 might typically be located at a branch bank with all data processing terminals at the branch bank being connected into the loop 38. The controller 32 may itself be connected to a communication channel 22 of communication controller 18 either directly through a communication link 48 such as a utility communication line as shown in FIG. 1 or may itself be connected in a communication loop such as the loop 38 which extends to a communication channel 22 of communication controller 18. A description of one such communication system may be found in patent application Ser. No. 482,940, filed June 25, 1974, entitled "SEMI STATIC TIME DIVISION MULTIPLEX SLOT ASSIGNMENT" by C. McClearn and T. A. C. Miller IBM (KI973007).

In general, the controller 32 merely acts as a relay device for information which is passed around the loop 38 but may also serve as the host data processing system when immediate, real time communications with the host data processing system 12 are not maintained. When serving as the host, the controller 32 must store transaction execution information for later processing by the system 12 and must provide host support functions which are required for operation of a terminal 14.

TRANSACTION EXECUTION TERMINAL

Figure 2:
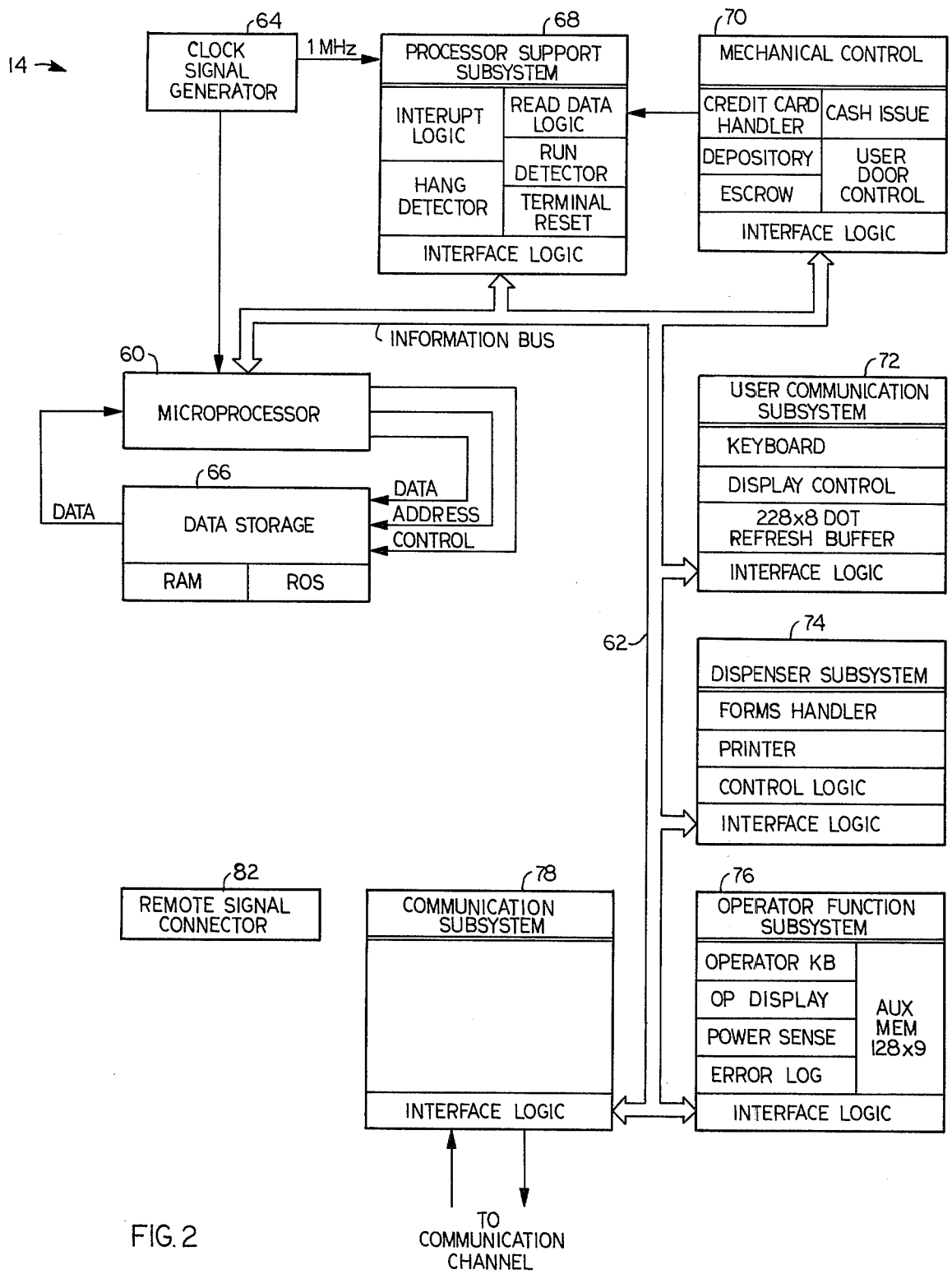
FIG. 2 is a functional block diagram representation of a transaction terminal used in the transaction execution system shown in FIG. 1.

While the particular manner in which a transaction terminal 14 is implemented is not critical to the practice of this invention, a preferred embodiment of the transaction terminal 14 is shown in FIG. 2. The terminal 14 is generally modular in nature and includes a programmable microprocessor 60 coupled to a plurality of terminal subsystems by an information bus 62. The microprocessor 60 is driven by a clock signal from clock signal generator 64 and is operationally connected to a data storage module 66 providing both electrically alterable random access memory (RAM) and read only storage (ROS). The read only storage portion of the data storage 66 stores the various operating programs for the microprocessor 60. The random access memory portion of data storage module 66 provides a scratchpad for program execution. With typical IC memories the contents of the RAM are lost in the event of a power failure.

TERMINAL INFORMATION BUS

The microprocessor 60 communicates with the modular subsystems solely through the terminal information bus 62. This technique of interconnecting modular subsystems with the microprocessor 60 through the bus 62 permits the microprocessor 60 to receive detailed information on the terminal status and maintain detailed direction of terminal hardware operations without a large number of input and output information connections. The task of sensing terminal status information is performed by the individual terminal subsystems. This information is then transferred to the microprocessor 60 on command from the microprocessor 60. Similarly, the driver circuitry and hardware for executing microprocessor commands is contained within the subsystem modules. The microprocessor commands are extremely basic and detailed in nature. Each command accomplishes a basic subsystem operation such as the activation or deactivation of a motor, the display or printing of a character, the feeding of a bill or the reading of a communication character. The information bus 62 includes a system reset signal, nine data input signals (eight bits + parity) for carrying information to the processor 60, nine data output signals (eight bits + parity) for carrying information from the microprocessor 60 to an operably connected subsystem, and bus control signals for controlling the transfer of information onto and off from the bus 62.

PROCESSOR SUPPORT SUBSYSTEM

One of the operational subsystems which is connected through bus 62 to micro-processor 60 is processor support subsystem 68. Processor support subsystem 68 provides hardware assistance to the microprocessor 60 in contrast to other terminal subsystems which have functions related to particular aspects of terminal 14 operation.

Processor support subsystem 68 receives a 1 MH$_z$ clock signal from clock signal generator 64 and divides this signal to generate lower frequency clock signals which are used in the other subsystems. One lower frequency clock signal is utilized for the generation of periodic interrupt commands at 10 msec. intervals.

These interrupt commands cause interrupt logic within processor support subsystem 68 to generate a microprocessor interrupt every 10 msec. The microprocessor 60 utilizes these clock period interrupts to maintain an event control time base for the various operations of the terminal 14. Reset logic within subsystem 68 controls the reset line of the information bus 62. Activation of this reset line causes initialization of the processor 60 as well as all modules which are connected to bus 62 and cancels any pending user transaction. The processor 60 is returned to a predetermined program instruction from which program execution can begin anew following the reset. The reset signal is activated in response to AC power on, a reset switch, or a hang signal from a hang detector within operational hardware subsystem 68. The hang detector monitors the control lines of the bus 60 and generates a hang signal when bus activity ceases for a length of time which is sufficient to indicate that the microprocessor 60 is not operating properly. A run detector responds to the timer interrupt request signals and generates a run signal which is maintained active so long as the microprocessor regularly responds to the requests. If a predetermined period of time elapses without the processing of a timer interrupt request, the run detector terminates the run signal. The processor support subsystem 68 also includes read data logic which receives a string of serial information as it is read from a user credit card, separates the data from the clocking information, deserializes the binary bit stream and places the information on the bus 62 for processing by the microprocessor 60.

MECHANICAL CONTROL SUBSYSTEM

A mechanical control subsystem 70 provides the actual mechanical manipulation of various hardware features of the terminal 14. Subsystem 70, which like the other subsystems has no branching or decision making capability, executes basic, elemental commands from the microprocessor 60 and collects information on the physical status of the various hardware functions for communication back to microprocessor 60. As an example of the individual elementary nature of functions which are executed by mechanical control subsystem 70, a credit card handler mechanism responds to a credit card direction and move commands to activate a motor which drives a card conveyor system to move the credit card beneath a read head. Sensors (switches or photocells) are positioned to sense the presence of the credit card at (1) entry, (2) exit jam sensor, and (3) card escrow positions. When a sensor is activated an information bit is available in a status word to indicate this condition. When the microprocessor 60 periodically reads the various status words during a read operation it determines that the credit card has reached the escrow area where the card is held. Processor 60 then commands that the credit card feed motor be reversed for a short period of time to "brake", and then commands that the motor be turned off. In similar elemental fashion, the mechanical control subsystem 70 controls the complete processing the credit card such as retention or return to the user. Other functions include control of the depository wherein the user may deposit documents which are passed into a retention bin in such a manner that the user never has access to the retention bin. Similarly, the mechanical subsystem 70 controls the opening and closing of user access doors and the issuance of predetermined amounts of cash to an escrow area at which printed transaction statements may also be accumulated along with the cash and the issuance or retention of documents presented to the escrow area. In addition to sensing the status of mechanical hardware which is manipulated by mechanical control system 70, the control subsystem 70 senses the presence of cash stored by the cash issue hardware and indicates when there is not enough cash available to execute a maximum issue transaction. Subsystem 70 also senses several conditions that may be communicated to a remote control panel as well as the processor 60. These remote signals include an indication of whether the service door is opened, whether or not a penetration sensing grid has been disturbed, and whether or not an "intervention required" condition exists. Other signals which may be communicated to the remote panel include transaction statement forms or cash low, operator access service door open, communication between the terminal and host ready. Command switches located on a remote panel may include a terminal reset switch and a wrap switch which commands a test of the communication link.

USER COMMUNICATION SUBSYSTEM

A user communication subsystem 72 controls bidirectional communications between the terminal 14 and a user. The communication subsystem 72 includes a keyboard for receiving user generated commands, a display of 222 horizontal dots by seven dots and includes display control logic and a refresh buffer. The display control logic receives the "dot image" of the particular display and then continues the display until a contrary command is received.

The keyboard is divided into several fields with a plurality of keys in each field. For instance, a transaction selection field indicates the type of transaction a user wishes to execute. Other fields include a from account select field indicating an account from which funds are to be taken, a to account select field indicating an account to which funds are to be deposited and a numeric keyboard field permitting the entry of decimal numbers such as personal ID numbers or dollar amounts. "Back lights" are provided on the function select, to account, and from account keys to generate an audit trail indicating to a user which keys have been selected in previously used fields. All back lights are illuminated in the field in which the next key activation should occur. For instance, as a user inserts his credit card into the terminal 14 he is requested to key in his personal ID number. After proper receipt of the ID number all of the keys in the function selection field would become lighted. As the user activates a particular key, such as a funds transfer key, the other back lights are extinguished with only the funds transfer key remaining backlighted. All keys in the next field such as the from account field are then illuminated in preparation for the next step in the transaction request. In this way an audit trail is provided to indicate previous selections and the next selection field is also indicated. Display messages and color coding may also be used to guide the user in the proper sequence. The keyboard control logic of the user communication subsystem 72 includes the circuitry necessary to back light specific keys commanded by the microprocessor 60 and to indicate to the microprocessor which keys have been activated by a user.

TRANSACTION STATEMENT DISPENSER

A transaction statement dispenser subsystem 74 includes a form handler for transporting transaction statement forms, a printer, printer control logic and logic for interfacing the subsystem 74 with bus 62. The transaction statement dispenser subsystem 74 performs only specific, basic commands such as starting movement or printing of specific characters. The subsystem 74 collects information on the physical status of the transaction statement dispenser hardware for communication through bus 62 to the microprocessor 60. This information is then used by the microprocessor 60 which operates under program control to detect the successful completion of a particular elemental function and commands the initiation of additional functions.

OPERATOR FUNCTION SUBSYSTEM

An operator function subsystem 76 provides operator maintenance interfacing and includes entry switches, a four digit hexadecimal display, power sense circuitry, a 128 byte power off protected auxiliary memory which is used for storing system parameters and logging exception information. Stored parameters include a cash counter number, encryption keys and a transaction number. Access to the operator panel is through a double locking door at the rear of the terminal 14 which must be closed for user operation. Opening of the access door and attempting a maintenance function causes destruction of encryption keys which are normally stored in this auxiliary memory. This destruction of the keys provides security of the keys from an operator who might seek to use electronic instruments to read the key from the nonvolatile memory. The keys must then be re-entered through the keyboard by a person of high trust before the terminal can be reopened. The eight byte keys are each entered as 16 hexadecimal digits two digits at a time. Only the two preceding digits are displayed as the keys are entered to increase the difficulty of an interloper discovering the keys. Alternatively, a Key A which defines the correspondence between account numbers and personal ID numbers may be even further protected by requiring entry of a deencrypted Key A (Key A') which is encrypted in accordance with a fourth encryption key to produce the actual Key A. Using this technique the actual Key A can remain secure from all personnel at the physical location of the terminal 14. The power sense circuitry monitors both the AC utility voltage level and the internal DC power levels and in the event of an indication that AC power is lost and the DC voltage levels are low but still usable, a signal is sent to the microprocessor 60 causing critical information to be saved and then access to the auxiliary memory is restricted while the memory is driven from an auxiliary power source. An indication signal is provided to the operator panel so long as the DC logic voltages are adequate.

COMMUNICATION SUBSYSTEM

A communication subsystem 78 provides communication interfacing between a communication channel and the information bus 62. Communication subsystem 78 is conventional in nature and receives information from or provides information to terminal information bus 62 one byte at a time.

REMOTE CONNECTOR

A remote signal connector 82 permits the connection of some status signals and some control signal inputs to a remote control panel which is actually part of the terminal 14. For instance, a bank branch might have five terminals 14 and a single centralized remote control panel with optical displays and control switches for each of the five terminals 14 at a convenient centralized location. These remote signals are primarily for monitoring terminal operation or controlling special conditions and are not utilized for normal user transactions. The particular remote panel has been previously explained.

COMMUNICATION MESSAGE FORMAT

There are essentially two different types of messages which may be sent from a terminal 14 to a host data processing system and four types of messages which may be sent from the data processing system 12 to a host transaction terminal 14. The terminal to host messages include a transaction request message which is the normal first communication message following a user initiated transaction and a status message which is typically the last of a three message sequence. There are two basic types of status messages. The first is a reply status message which serves as the third communication message in a normal user transaction sequence and informs the host of the completion or cancellation of a user requested transaction. The second is an exception status message which indicates a status or condition for a terminal 14 other than a normal operating condition. For example, an exception status message would be sent in reply to an inquiry command from the host data processing system, when the service door is opened, upon detection of a serious error condition such as a user door jam or a hard machine failure or any time initialization is required.

The four types of messages which may be transmitted from a host data processing system 12 to a transaction terminal 14 include a transaction reply message, command message, a load initialization message, and an echo message. The transaction reply message is the normal response to a transaction request message during the course of a normal user transaction and informs the terminal 14 of the manner in which the requested transaction should be completed. A command message commands changes in a terminal 14 logical state and may also serve as an inquiry for a status message if no changes are desired. A load initialization message is sent from a host to a terminal 14 in response to an exception status message requesting initilization (IPL). The load initialization message contains message text, option selection information, font tables, program routines, and data information for storage in the volatile random access portion of data storage 66 of the microprocessor 60 within a terminal 14. An echo message is used as a diagnostic assurance test and can be sent only when a terminal 14 is in a closed state. The terminal 14 responds to an echo message with an echo message.

There are only three basic message sequences which may be used for the communication of messages between a terminal 14 and a host data processing system 12. A single message sequence consists of an exception status message transmitted from a terminal 14 to a data processing system 12. The exception status message may either indicate that an abnormal condition has occurred or be a request for initialization. A "command message" from the host is not required. The message contents indicate which is the case.

A two message sequence may include either a command message or a load initialization message from a host data processing system 12 to a terminal 14 followed by an appropriate status message from the terminal 14 to the host data processing system 12 or a host echo message followed by a terminal echo message. The transaction terminal 14 will reject a command that is received while the terminal is processing a previous command, an unintelligible message, or an unrequested transaction reply message. In each instance the host may be either a remote system or a directly connected local system.

Each time the terminal 14 assumes an initial power on condition, for whatever reason, the terminal 14 must request and receive a load initialization message from the host data processing system before the terminal 14 can be reopened to accept transactions. Transaction terminals such as terminals 36, 44, and 46 in FIG. 1, which are connected to a controller 32 may operate in an off-line mode. Under such circumstances, the controller 32 serves as the host data processing system and merely records user transactions, for example on magnetic tape or disk. The transaction information is then made available to a transaction accounting system at a later time to permit the updating of accounts. If operating in an on-line mode, some host functions may be handled by the controller 32 such as storage of the initialization program for the terminals, but normally all communications are merely communicated to the host data processing system 12 without change. In such an on-line mode of operation, the host data processing system 12 may update account records stored in its data base in real time; that is as user requested transactions are executed.

Each time a terminal 14 loses power information is lost from the RAM portion of data storage 66, and initialization must be requested at power turn-on. After the receipt of initialization information from the host a terminal 14 may be opened to receive user transactions, but only on command from the host. Initialization is accomplished by a terminal 14 using the single message format to send an exception status message requesting initialization. The host data processing system then initiates a new communication sequence by sending an initialization message (in multiple parts) containing the requested initialization information. Upon successfully receiving the initialization information the requesting terminal 14 completes the two part message sequence by sending a status message back to the host data processing system.

Every message which is sent between a transaction terminal 14 and a host data processing system 12 begins with a four byte header field. Byte 1 of the header field is a message length byte (L) containing a binary count of the number of message bytes in the message text (including L). Byte 2 is a 1 byte transaction sequence number (N) in binary form. This number is incremented for each new user transaction and is included in all messages exchanged for that transaction. The number has a range of 1 to 255 inclusive. Zero (hex 00) is used for messages that do not relate to a user transaction. Thus, a transaction number counter which is incremented for each new user transaction overflows from hex FF to hex 01. The transaction number (N) is stored in the power out protected auxiliary memory of operator function sub-system 76 so that it remains available after a short term power outage. Byte 3 of the common header field is a class byte (C) which identifies the type of message and thus the format of the message which is being sent. Byte 4 is the final byte of the header field and identifies a message sub-class (SC) which serves as a modifier to the message class byte.

Only a few of the possible combinations of message classes (C) and sub-classes (SC) are actually implemented. Class hex 01 identifies a transaction request message from a terminal 14 to a host data processing system. Within class 01, nine sub-classes have been implemented. Sub-class hex 00 indicates that a user requested transaction is incomplete because the ID number has not been properly entered. Sub-class hex 01 indicates a cash issue request. Sub-class hex 02 indicates an account inquiry. Sub-class hex 03 indicates that a user is requesting to deposit funds. Sub-class hex 04 indicates that a user is requesting to transfer funds from one account to another. Sub-class hex 05 indicates that a user is requesting to pay a loan or bill by depositing money in the transaction terminal. Sub-class hex 06 indicates a special transaction wherein the nature of the transaction is identified by entry of a predetermined number through the keyboard rather than by activation of a single key in the transaction selection field of the keyboard. Sub-class hex 07 indicates that a requested transaction is incomplete because the deposit flap covering the deposit bin has been jimmied. Sub-class hex 08 indicates a user request to pay a bill or loan by the transfer of funds from one account to another.

A class of message designated C = hex 15 identifies a status message from a terminal 14 to a host data processing system 12. There are five sub-classes of messages under this class. Sub-class hex 01 indicates a transaction completion status message. Sub-class hex 02 indicates that the message is in response to the execution of a command and the status number, N, in the common header must be set to 0. Sub-class hex 03 is an exception status message indicating an error condition or requesting initialization and the transaction number N must be set to 0. Sub-class hex 04 indicates that the status message is in response to initialization and the transaction number N must be set to 0. Sub-class hex 08 is a recovery request or command response message and the transaction number N must be set to 0 for this message. A recovery request indicates that the host has lost track of the current transaction and requires an update. The terminal responds with an exception status message.

A transaction reply message from a host data processing system to a transaction terminal 14 is indicated by class hex 0B. There are nine sub-classes indicated by the sub-class byte under this sub-class. Sub-class hex 00 indicates that the transaction is incomplete because the ID number was not properly entered. Sub-class hex 01 indicates a cash issue transaction request. Sub-class hex 02 indicates an account inquiry transaction request. Sub-class hex 03 indicates a deposit transaction request. Sub-class hex 04 indicates a funds transfer transaction request in which funds are to be transferred from one account to another. Sub-class hex 05 indicates a transaction request for the payment of a loan or bill by transfer of funds deposited in the terminal to an account. Sub-class hex 06 indicates a special optional selection transaction wherein the nature of the transaction is determined in accordance with a number entered through the numerical keyboard rather than by the activation of a single key in the transaction selection field of the user keyboard. Sub-class hex 07 indicates that the message relates to a requested user transaction which is incomplete because the deposit flap of the terminal 14 has been jimmied. Sub-class hex 08 indicates a user transaction wherein a loan or bill is to be paid by transferring funds from one account to another.

Class hex 0C identifies a command message from the host data processing system to a terminal 14. A command message does not relate to a particular transaction and therefore the transaction number N of the header field is always set to 0. Sub-class hex 01 indicates an open command. Sub-class hex 02 indicates a command to close the transaction terminal 14. Sub-class hex 03 indicates an inquiry type of message in which a transaction terminal 14 may not perform any function in response to the command but must respond with a status message. Sub-class hex 04 indicates a command to change the third key (key B) which is the transmission encryption key from the present key to a key contained within the message. Sub-class 05 indicates a command to set the transmission encryption key (key B) using a back up key (key C). Sub-class hex 06 indicates that a transaction terminal 14 is commanded to request an initial program load. Sub-class hex 07 indicates that the message includes a command to either change the optical display or contains a written message to be printed by the transaction statement dispenser. Sub-class hex 08 is a command for transaction terminal 14 to send a class hex 15 sub-class hex 08 recovery request message back to the host.

The load initial program message from the host to a transaction terminal is designated class hex 0D and has only one sub-class which is designated hex 01.

An echo message from the host data processing system to a terminal 14 is designated by class hex 10. Within this class there are four sub-classes of echo messages. Sub-class hex 00 is the basic echo message and merely commands the transaction terminal 14 to retransmit the echo message back to the host data processing system. Sub-class hex 01 indicates an echo canned message command which is both checked for bit pattern and echoed. The bytes of data in the canned text are designed to send all possible bit patterns to check the operation of communication facilities. The message pattern is retained by the terminal for comparison with a second transmission of the message pattern. An echo variable record sub-class designated hex 02 is similar to the canned echo sub-class except that the message may contain host entered data. The transaction terminal echos the message back and also retains the message in storage for comparison with a second transmission of the same message. Upon receipt of the second transmission of the message, the transaction terminal checks and echoes as for sub-class 01. A log data request message is designated sub-class 03. This will cause the terminal to send the 8 most current error log records. No encryption or decryption is involved in the transmission of any echo message.

The four byte common header field of each message is followed by the message data in a format that depends upon the particular type of message that is being sent. For a transaction request message from the terminal 14 to the host data processing system bytes 1–4 of the common header are followed by bytes 5–8 which contain a 32 bit encrypted field. This 32 bit encrypted field will be discussed in greater detail later, but in general the field includes an encrypted form of the personal ID number which was entered through the user keyboard and one byte of varying information which may be either the contents of a cash counter or a transaction number counter.

Byte 9 is a from account select (FAS) byte indicating which key within the from account selection field of the user keyboard was activated. The data content of this ninth byte indicates the type of account from which the funds for the user requested transaction are to be taken. Hex 21 indicates from a checking account, hex 22 indicates from a savings account, hex 23 indicates from a credit card account, and hex 24 indicates from a special optional selection account, which is further defined by a numeric modifier. By making special arrangements with the bank, a user can open multiple accounts. These accounts can then be assigned predetermined three digit (decimal) numbers. By activating the special optional selection from account key on the keyboard the user is then permitted to enter up to three decimal numbers through the numerical keyboard to indicate which of possibly many predefined accounts he wants debited. This account identification number is transmitted one digit per byte in bytes 10-A where A may assume the values 10, 11 or 12 depending on whether the special keyboard determined account number contains one, two or three digits respectively. Because the FAS field may have a variable length, it must be followed by a field separator (FS) byte having the data content hex FE which is used to define the limits of variable length fields. Adjacent field separators indicate a zero length or no entry field between them. The FS byte delimits the end of the field preceding the FS byte.

Following the FS byte for the from account select (FAS) field is a to account select (TAS) field designating an activated key within the to account select field of the user keyboard. Hex 31 indicates that funds are to be deposited to a checking account, hex 32 indicates to a savings account, hex 33 indicates to a credit card account, and hex 34 indicates to a special optional selection to account select key which may be modified by up to three digits (decimal) immediately following the first TAS byte. These numeric modifiers have the same meaning in the TAS field as in the FAS field. Because the TAS field is variable in length it must also be followed by a field separator (FS) byte having data content hex FE. Following the field separator byte for the to account select field, the data which is read from the magnetic stripe on the credit card is transmitted. By removing the parity bit from the standardized code of the American Bankers Association, it is possible to pack two four bit characters of credit card data in each byte of the message. In the event that an odd number of credit card characters appears on the credit card, the last byte is padded with a hex F to fill all bytes of the message. Start of card characters, end of card characters and longitudinal redundancy check (LRC) characters are excluded from the transmitted transaction request message in as much as they are checked by the terminal 14.

A status message from a terminal 14 to the host data processing system begins with the four byte common header field identifying the message length (L), transaction number (N), message class (C), and message sub-class (SC) for the message. In byte positions 1–4. Byte positions 5–8 contain a 32 bit encrypted field.

This 32 bit field will be discussed in greater detail below but in general contains a repetition of the eight bit transaction number (N), eight bits representing the revolving cash count for denomination two (CNTR2), eight bits indicating the number of status bytes (CB) and eight bits representing the revolving cash count for denomination one (CNTR1). The byte CB is a one byte field containing a binary count of a number of status and inquiry data bytes which follow the encrypted portion (bytes 5–8) of the message for a normal status message. For a "request recovery message" the CB field contains the "action field" from the transaction reply for the last transaction request message. The "action" field is an eight bit field transmitted as part of the 32 bit encrypted field of a transaction reply message. The eight bit counter portion (CNTR) of the 32 bit encrypted field indicates binary count of bills issued by the second and first cash issue mechanism. These numbers are taken from counters which are incremented for each issued bill and roll over from hex FF to hex 00. The counts are stored in the auxiliary memory of the operator function subsystem 76 so that the count is preserved during a short term power outage. Following the 32 bit encrypted field at bytes 5 to 8 is a data field. The data field includes a four byte status field in byte positions 9–12. These four bytes define the current status of a terminal 14 as discussed below. Most status messages terminate with an FS byte at byte position 13. However, a status message which is sent in response to an inquiry command message contains 112 of the 128 bytes stored in the auxiliary memory of the operator function subsystem 76 which are transmitted behind the four status bytes. For this message the field CB would contain the number 116. The 16 bytes of the non-volatile memory which are not sent in response to an inquiry message contain the two eight byte encryption keys. If the status message is being resent in response to a request recovery message, the four status bytes contain the four bytes of the last transaction status message and are followed by the complete original transaction request message. This information then would allow the host to re-construct the conditions which existed prior to the event which caused the host to request recovery.

The 32 bit positions of the four status bytes at byte positions 9–12 of a status message each have a predetermined meaning. These meanings are assigned to define the physical and operating status of a terminal 14 with sufficient particularity that a host data processing system can assess and control the general operation of each terminal 14. These meanings are described in tabular form below with the number to the left indicating the status byte number ranging from 0 to 3 with status byte 0 in status message byte position 9 and status byte 3 in status message byte position 12. For each status byte there are eight bits designated bit 0–bit 7 with a bit 0 being in the most significant bit position and bit 7 in the least significant bit position.

| Byte | Bit | Description |
|---|---|---|
| 0 | 0 | Transaction completion status bit. This bit position is set to logic 1 at the beginning of each transaction to indicate that the transaction has not been completed because a transaction reply message is required. The bit position is reset to logic 0 when a transaction has been executed as specified in a transaction reply message. |
| 0 | 1 | Invalid transaction sequence number in transaction reply bit. This bit position is reset to logic 0 each time a new transaction is started. The bit position is set to logic 1 any time the transaction number (N) within the common header field of a message received from the host data processing system is inaccurate. An exception is made for an echo message which does not convey meaningful information in the transaction number position of the header field. |
| 0 | 2 | Invalid transaction subclass in reply message bit. This bit position is reset to logic 0 at the beginning of each new user transaction and set to logic 1 any time the subclass byte in the fourth byte of the common header field of a transaction reply message does not match the subclass byte of the corresponding transaction request message. Byte 0 bit 0 must be set each time this bit position is set. |
| 0 | 3 | Invalid class bit. This bit position is reset to 0 after an exception status message has been sent and is set to logic 1 any time a message is received from the host data processing system containing an invalid class designation in byte 3 of the common header field. As an example, a terminal 14 might receive a nonrequested initialization (IPL) message or a nonrequested transaction reply message. |
| 0 | 4 | Amount error in transaction reply message bit. This bit position is reset to logic 0 at the beginning of each new transaction and set to logic 1 any time a transaction reply message is received with the dollar amount byte within the encrypted field thereof indicating an improper dollar amount. (AMT) Bit 0 of byte 0 must be set to logic 1 any time this bit position is set to logic 1. |
| 0 | 5 | Unassigned. |
| 0 | 6 | Customer cancelled transaction bit. This bit position is reset to logic 0 at the beginning of each new transaction and set to logic 1 in the event that a customer activates a cancelled key on the user keyboard subsequent to the transmission of a transaction request messgage. |
| 0 | 7 | User timeout bit. This bit position is reset to |

-continued

| Byte | Bit | Description |
|---|---|---|
| | | logic 0 at the beginning of each new user transaction and set to logic 1 any time a user consumes more than an allotted predetermined length of time in entering a number through the user keyboard or in depositing materials through the deposit flap. Bit 0 of byte 0 must be set any time this position or position 0 6 is set to logic 1. |
| 1 | 0 | Command reject bit. This bit position is reset to logic 0 after a command status message is sent. The bit position is set to logic 1 upon receipt of a command message which cannot be executed because the terminal 14 is busy at the time a command is received. |
| 1 | 1 | Invalid command bit. This bit position is reset to logic 1 upon sending a command status message. The bit position is set to logic 1 any time a command message is received with missing fields therein. For instance, a key change command which does not include the new key or a change display command without a new display field. This bit position is also set to logic 1 in response to a command message containing an invalid subclass designation in byte 4 of the common header field. |
| 1 | 2 | IPL request. This bit position is reset to logic 0 upon the proper receipt of a load initialization message from the host data processing system and set to logic 1 each time a terminal 14 goes from a closed to an open condition, for example, upon closure of the operator/customer engineer access panel, or upon command from the host data processing system. This bit is also set to logic 1 each time a terminal 14 receives a command message commanding the terminal to request an IPL. |
| 1 | 3 | IPL and process bit. This bit position serves as a modifier bit for bit position 2 of byte 1. A combination of bit 2, bit 3 equal 00 indicates that the terminal is initialized. This condition can occur only when the terminal is in an open state. The combination of bit 2, 3 equal 10 indicates that initialization has been requested but the load initialization message hs not been received. A combination of bit 2, 3 equal 11 indicates that a load initialization is in process. |
| 1 | 4 | Cash counter error bit. This bit position is reset to logic 0 at the beginning of each new user transaction. The bit position is set to logic 1 any time a transaction reply message is received containing a cash counter byte (CNTR) within the encrypted field thereof which does not match the status of the cash counter within the terminal. The cash counter is a rollover counter which is incremented each time a new bill is issued. Byte 0, bit 0 must be set to logic 1 each time this bit position is set to logic 1. |
| 1 | 5 | C and CS field error bit. This bit position is reset to logic 0 upon sending an exception status message. It is set to logic 1 upon receipt of a command message from the host data processing system containing a class and subclass (C&SC) byte within the encrypted data field that does not match the class and subclass byte of the common header field. This failure to match indicates a possible encryption key synchronization error or host error. In a normal command message, the two class (C) and subclass (SC) bytes of the common header field are combined into a single class and subclass (C&SC) byte (packed by sensoring the four leading 0 bits of each byte). |
| 1 | 6 | Communications timeout on transaction, reply sequence bit. This bit position is reset to logic 0 at the beginning of each new user transaction. The bit position is set to logic 1 any time a predetermined period of time expires following the transmisson of a user transaction request message without the receipt of a corresponding transaction reply message. Byte 0, bit 0 must be set to logic 1 any time this bit position is set to logic 1. |
| 1 | 7 | Unintelligible message bit. This bit position is reset to logic 0 after sending an exception status message. It is set to logic 1 to indicate an unintelligible message any time a message is received which does not correspond to the required predetermined message format. For example, the number of bytes may not agree with the message length (L) designation in the common header or a parity error may occur upon reading a data byte or a byte position may contain invalid data. |
| 2 | 0 | Card retained bit. This bit is reset to logic 0 at the beginning of each new user transaction and is set to logic 1 any time a user requested transacton is terminated with the terminal 14 retaining the credit card which was inserted therein by the |

| Byte | Bit | Description |
|---|---|---|
| | | user. This bit position indicates that the card was retained as a result of a hardware error at the terminal 14 rather than in response to a command from the host data processing system. |
| 2 | 1 | Dispense error bit. This bit position is reset to logic 0 at the beginning of each new user transaction. The bit position is set to logic 1 any time an error occurs during the dispensing of a document such as a bil or a Unassigned. statement. This bit position is set ay time a document is dumped from an escrow area into a retention bin. Since the transaction may be completed upon retry, this bit positon does not necessarily indicate an incomplete user transaction. |
| 2 | 2 | Unrecoverable depository error bit. This bit position is reset to logic 0 at the beginning of each new user transaction. This bit position is set to logic 1 ay time an error condition such as a jam occurs in the terminal depository and the terminal is unable to recover from the error condition. |
| 2 | 3 | Display table overflow bit. This bit position is reset to logic 0 upon sending a status message. The bit position is set to logic 1 upon receipt of a change display command message from the host data processing system containing more display data than the terminal display system can handle. An improper display message is not accepted by a terminal 14. |
| 2 | 4 | Unassigned. |
| 2 | 5 | Unassigned. |
| 2 | 6 | Unassigned. Intervention requred bit. This bit is set when an intervention requied condition occurs. It is reset when the intervention requied indicator is turned off. |
| 2 | 7 | Card removal timeout bit. This bit position is reset to logic 0 at the beginning of each new user transaction. The bit position is set to logic 1 whenever a predetermined period of time expires following the availability of a credit card to a user without the card being removed from a terminal 14. This bit position indicates that some kind of intervention is required. Normally, the host data processing system would respond by commanding the terminal to retain the credit card. |
| 3 | 0 | Open/close bit. This bit position is rest to logic 0 any time the terminal opens and is ready to receive a user transaction request. This bit position is set to logic 1 each time the terminal closes. |
| 3 | 1 | Cash out condition bit. This bit position is reset at the beginning of each new user transaction. This bit position is responsive to a hardware switch which indicates whether or not there is enough cash stored in the terminal to execute a maximum cash issue transaction. The bit position is set to logic 1 any time the cash out condition occurs during the execution of a preceding cash issue transaction to which the status message corresponds. The setting of this bit position indicates that intervention is required and causes a terminal to close. |
| 3 | 2 | Invalid backup encryption key bit. This bit position is reset to logic 0 upon sending a status message and is set to logic 1 upon receipt of a change key type of command message from the host data processing system containing an improper encryption key (an improper encryption key contains all zeros). |
| 3 | 3 | Transaction statement dispenser form out bit. This bit position is reset to logic 0 at the beginning of each new user transaction. It is set to logic 1 when a transaction statement sensor indicates that the last usable transaction statement form is issued during the last preceding transaction to which the status message corresponds. |
| 3 | 4 | Deposit flap (door) or issue gate open bit. This bit position is reset upon sending a status message. The bit position is set to logic 1 when the deposit flap or issue gate remains open when it should be closed and indicates that the flap or gate has been jimmied. |
| 3 | 5. | Unrecoverable hardware failure bit. This bit position is reset to logic 0 after an exception status message has been set. This bit position is set to logic 1 any time a jam or other error condition is encountered which canot be corrected, whether during the execution of a transaction or at any other time. Setting of this bit position indicates that intervention is required and the terminal closes. |
| 3 | 6 | Customer door open bit. This bit position is reset to logic 1 upon sending a status message. The bit position is set to logic 1 when the customer door which provides access to the user keyboard and display is open when it should be closed and indicates that the door has been jimmied. Setting |

| Byte | Bit | Description |
|---|---|---|
| | | of this bit indicates that intervention is required and causes the terminal to close. |
| 3 | 7 | Security enclosure interlock bit. This bit position is reset to logic 0 when the operator access door is closed and set to logic 1 when the door is open. The terminal 14 closes any time this bit position is set to logic 1. |

A transaction reply message from a host data processing system 12 to a user terminal 14 is generated in response to a user transaction request message. The transaction reply message begins with the standard four byte common header field specifying total message length (L), transaction number (N), message class (C), and message subclass (SC). Following the four bytes of the common header field are four bytes or 32 bits of encrypted information, a variable length optional display data field, a field separater character (FS) and a variable length optional transaction statement print field, and a final field separation character (FS). The four byte encrypted field includes a one byte cash counter 2 number (CNTR 2), a single action byte, a one byte cash counter 1 number (CNTR 1), and an amount byte (AMT) which specifies the number of bills for which the reply message is authorizing issuance. The terminal 14 checks this authorized amount against the request.

The action byte is a one byte instruction from the host data processing system 12 which directs a terminal 14 to consummate a user transaction in a manner consistent with the data contents thereof.

Bit 0. When bit 0 is set to logic 1, a terminal 14 is commanded to immediately display a standard terminal display message which is indicated by the optional display data field immediately following the encrypted field. Up to 128 separate messages designated 0–127 are stored in data storage 66 associated with the microprocessor 60. When bit 0 of the action byte is set to logic 1 the terminal 14 is commanded to display one of these messages which is indicated by the binary content of the one byte optional display field at byte position 9 of the transaction reply message.

Bit 1. When bit 1 is at logic 1 terminal 14 is commanded to immediately display an optional display message contained within the optional display data field immediately following the encrypted field. When bit 1 is set to logic 1, byte 9 at the beginning of the optional display data field contains a binary number indicating the length of the display message in bytes exclusive of byte 9. Immediately following byte 9 the transaction reply message contains the text of the desired display message in EBCDIC code with each byte indicating one display character.

Bit 2. A logic 1 at bit position two of the action byte indicates that a transaction terminal 14 is commanded to print information on a transaction statement and that the transaction statement print data field of the reply message contains the data to be printed in EBCDIC code.

Bit 3 not defined.

Bit 4. A logic 1 in bit 4 indicates that a requested user transaction is authorized as requested.

Bit 5. A logic 1 in this bit position indicates that a user's credit card is to be retained by the terminal 14 while a logic 0 indicates that the credit card is to be returned to the user.

Bit 6. A logic 1 in this bit position indicates that the user is required to acknowledge the transaction before the terminal 14 proceeds to execute the transaction. The user acknowledges the transaction by activating either a cancel key or a proceed key in a keyboard control field. Typically some indication of the transaction would be displayed at the time the user selects a key. For instance the message "TRANSFER $50.00 FROM SAVINGS ACCOUNT TO CHECKING ACCOUNT — depress cancel or proceed" might be displayed.

Bit 7. Not defined.

The transaction statement print field at the end of a transaction reply message is divided into a plurality of subfields which permit the communication of print data for up to 2 transaction statement forms. The first subfield is a common data subfield which carries information such as the user's name and account number which will be the same for both transaction statements. The common data field may either command a terminal 14 to print a canned print message stored within the memory 66 of a terminal 14 or may command the terminal to print a message transmitted as part of the common data field and standard EBCDIC code. The first byte of the common data field determines the source of the print data. If this byte contains a number from 1 to 127 (below hex 80) the print data is contained in standard EBCDIC form in the common data subfield immediately subsequent to the first byte. In this instance, the first byte represents a binary length count indicating the number of bytes of text in the common data field exclusive of the length byte. If the common print data is to be provided by a canned message, a print message ID number identifying the particular canned message is added to 128 (hex 80) and transmitted as the first and only byte of the common data subfield. By way of example, if the common data is to be taken from a canned message number 30, the one byte common data subfield would contain the binary number 30 + 128 = 158 (hex 9E). A one byte data content corresponding to ID number 0 (hex 80) is used as a deliminator for the common data and statement data and must not be used to define message $\phi$ as a canned message. A statement number one data subfield immediately follows a deliminator byte hex 80 after the common data subfield. The statement number one data subfield may carry an actual EBCDIC print message or may identify a canned print message and uses the same format as the common data subfield. Print information commanded by the statement number one data subfield, however, will be printed only on one transaction statement form designated form one. The deliminator character (hex 80) immediately follows the statement number one data subfield. A statement number two data subfield immediately follows the second deliminator character. The statement number two data subfield has a format and data content similar to the common data subfield and statement number one data subfield. The statement number two data subfield may contain either a transmitted print message in EBCDIC code or identify a canned print message. If the statement number two data subfield is not present, i.e. has a length of 0 byte, a second transaction statement form is neither printed nor issued. A field separator character (FS) immediately follows the statement number two data subfield to indicate the end of the transaction statement print field and the end of a transaction reply message. Printing of a transaction statement form begins in the upper left hand corner and proceeds left to right and line by line in the common English reading format. An EBCDIC carriage control code is utilized to terminate a line of text and begin the printing of the next textual character at the left most character position of the next line down. The printing operation follows a predetermined sequence in which common text is first printed on statement form one, statement one text is printed on statement form one, commmon text is printed on statement form two, and finally statement two text is printed on statement form two.

A command message is sent from the host data processing system 12 to a terminal 14 to control the operation or status of the terminal in accordance with the data content of the command message. Each command message begins with a four byte common header field containing message length (L), transaction number (N), message class (C) and message subclass (SC). A four byte encrypted field follows the four byte header field. The four byte encrypted field includes the cash counter byte (CNTR1), the class and subclass byte (CNSC) containing both the class and subclass indication combined into a single byte, a second cash counter byte (CNTR2), and a special byte (SPEC). The special byte is utilized for an inquiry type of command message to indicate the information which is to be supplied by a responsive status message from a commanded terminal to the host data processing system. Bits 0–4 of the special byte are unassigned and are normally transmitted as logic 0. Bit 5 is set to logic one to indicate that a terminal is being commanded to retransmit its last status message. Bit 6 is set to logic one to indicate that the terminal is to transmit a current status message plus the 112 bytes of auxiliary storage within operator function subsystem 76 which do not contain the two encryption keys. A logic 1 in bit 7 of the special byte indicates that the terminal is commanded to transmit a normal status messgae. Bits 5, 6 and 7 are mutually exclusive where only one should be on at a time.

Two optional encrypted fields follow the common header field and four byte encrypted field of a command message. The first optional encrypted field carries a first half of an eight byte encryption key and the second optional encrypted field carries the second half of an eight byte encryption key. These first and second optional encrypted fields are included only following a set key or change key command. A terminal 14 responds to a change key command by deencrypting the command message with the old third or transmission encryption key (key B) and then substituting the key received in the optional encrypted fields one and two for all future communications. A set key command operates like a change key command except that the new key is encrypted in a backup key (key C) stored in the auxiliary memory. In a "change display message" type of command message the two optional encrypted fields are not included in the message but a clear text optional data field follows the four byte encrypted field. The clear text optional data field begins with an index number (INDX) followed by a data field length byte (LD) and new display text in standard EBCDIC code. A "change display message" type of command message does not affect the actual display which is visible by a terminal user, but instead modifies the data content of a canned display message stored within the data storage 66. For example it may be desirable to change a canned display message "take out credit card" having a display message ID number 40 to "remove credit card". The index byte (INDX) contains the display message ID number of the canned message which is to be changed. The data field length byte (LD) contains a binary number indicating the number of bytes in the text of the new message which immediately follows. If the new message is too long to fit into the number of bytes available in the table of display messages within data storage 66, the command is not executed and the following status message indicates that the command was not executed. Because the display messages are of a variable length and because it is necessary for all messages from the host data processing system to a terminal 14 to contain an even number of bytes, it may be necessary to pad the end of a display text with an arbitrary pad character. This pad character would not be counted for the data field length byte (LD) but would be counted for the overall message length byte (L) in the common header field of the command message.

The load initialization message provides the information for the random access memory portion of data storage 66 which may have been lost in the event of a power shut down. It may also be used to reinitialize the terminal with new options. This message begins with the standard four byte common header field, followed by a two byte binary number field specifying the number of bytes in the following data field. The data field comprises the last field of the load initialization message and contains the customization image which is stored in data storage 66. The critical information such as micro program routines and option selection bytes in the data field is encrypted with the third transmission key (key B) in four byte sequential segments.

In general, the customization image which is received during initialization provides the information which may vary from one terminal to another and is therefore not readily implemented with read only memories. Included within the customization image are the canned user display and print messages which may include up to 49 predetermined messages designated message 1–49. Also included as message 50 is an optional font table containing up to 574 bytes which permits the display of non-standard characters or graphics which have been custom selected by a given terminal customer such as a bank. Also included in the customization image is a certain amount of programming and program control information to account for the particular combination of available options which is implemented with a given terminal.

TRANSACTION MESSAGE ASSEMBLY

Figure 3:
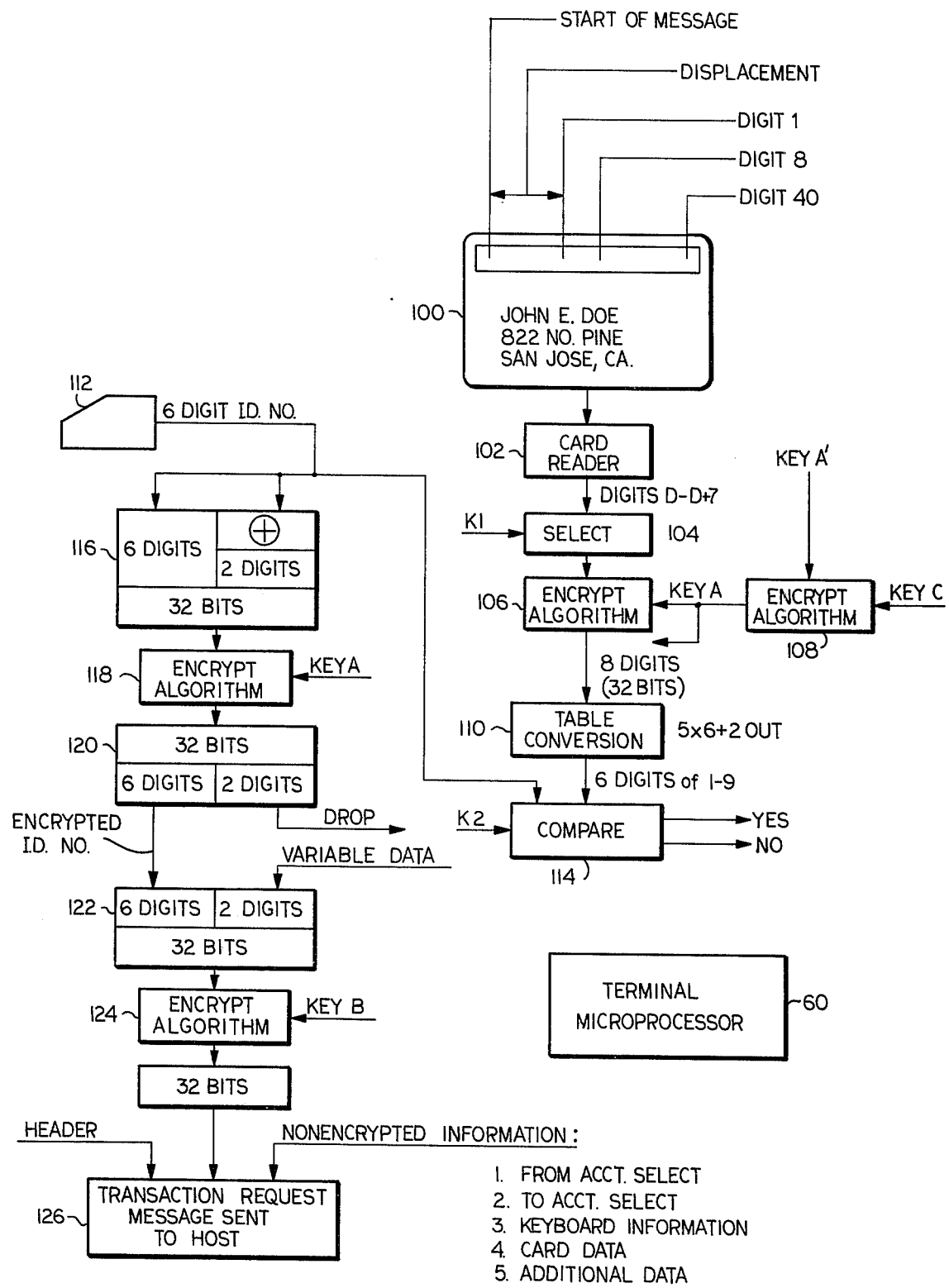
FIG. 3 is an operational block diagram representation of the manner in which a user initiated transaction request is initially processed by a transaction terminal.
Figure 4:
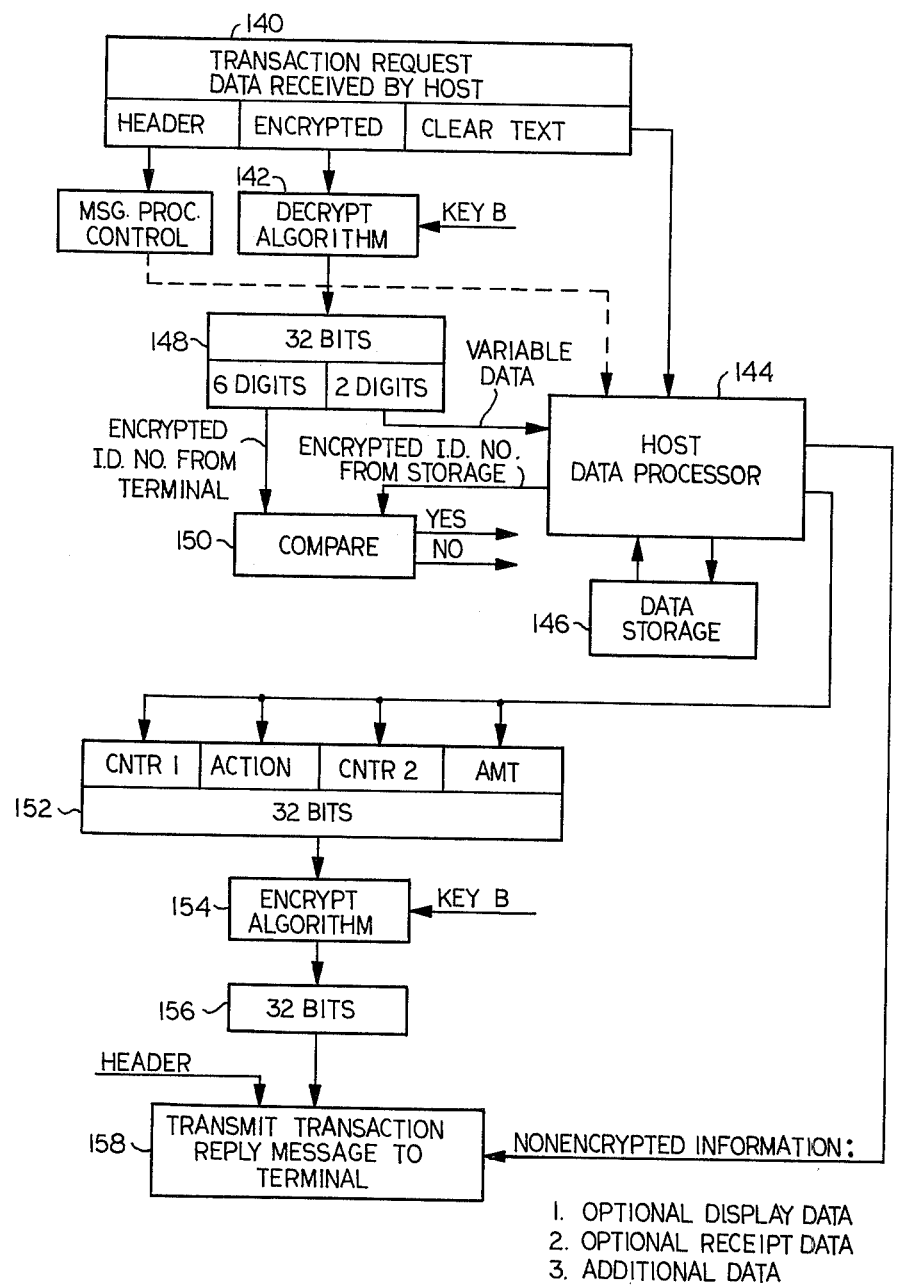
FIG. 4 is an operational block diagram representation of the manner in which transaction requests received by a transaction terminal are processed by a host data processing system.
Figure 5:
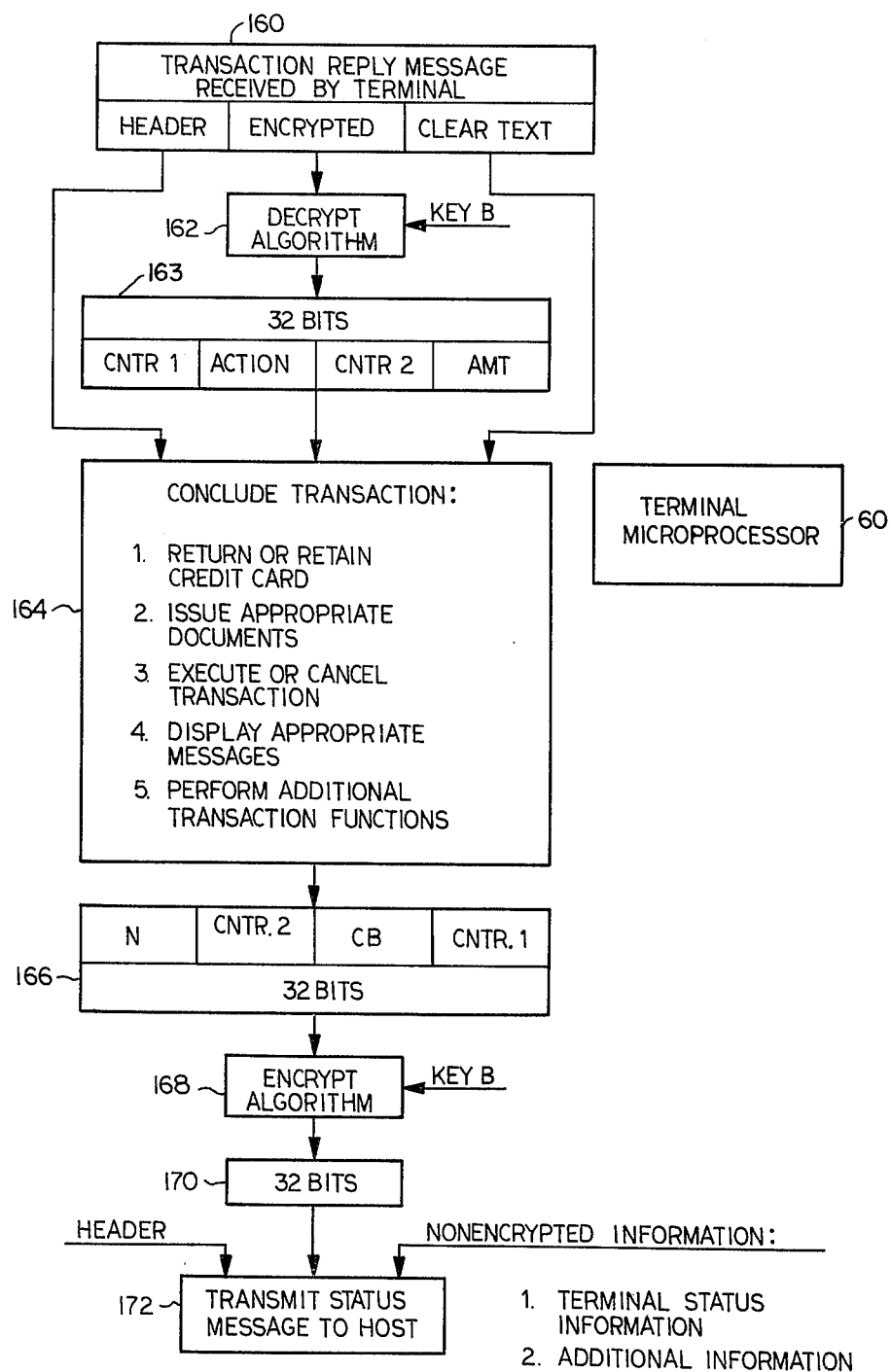
FIG. 5 is an operational block diagram representation of the manner in which a transaction reply message from a host is processed by a transaction terminal.

The communications which are involved between a host data processing system 12 and a user transaction terminal 14 during the execution of a requested user transaction are illustrated in further detail in the operational block diagrams of FIGS. 3–5 to which reference is now made. In order to facilitate an understanding of the operation of the invention, the operative communication system will be described in the context of specific user transaction examples. It should be appreciated however, that a transaction terminal 14 may perform any one of a large variety of user requested transactions and is not limited to these specific examples.

For a specific example it will be assumed that the terminal 14 is a through the wall terminal providing a walk up station at a branch bank. The through the wall terminal will be assumed to be connected in a manner similar to terminal 46 (FIG. 1) in a closed loop to a controller 32 and through the controller 32 to a host data processing system 12. The terminal 46 extends through an exterior wall of the branch bank with the user communication facilities outside the bank and the majority of the terminal inside the bank. The operator maintenance access panel is accessible via the service door from the interior of the branch bank. As a potential user approaches the terminal 46 the illumination of the keyboard area and a sign on the face of the terminal indicate that the terminal is in an available (open) condition. No light and a "closed" display indicate that the terminal is unavailable for the execution of transaction. If the terminal is in a closed condition any user action is ignored. If the terminal indicates an open condition, the prospective user initiates a user transaction by inserting his credit card into a slot. In this example, it will be assumed that a user desires to transfer funds from his savings account to his checking account.

1. TRANSACTION REQUEST MESSAGE

The first portion of the three part user transaction communication sequence is illustrated in FIG. 3. The terminal microprocessor 60 is shown only generally in FIG. 3 with no specific connections being made to physical or functional blocks. It will be appreciated that logical interconnections are as shown in FIG. 2 and that operational control and data processing are performed by the program microprocessor 60.

At the time the prospective user is issued a credit card 100 by the customer bank, he is also assigned a six digit personal identification (ID) number. This personal ID number may optionally be related to information recorded on a stripe of magnetic material on the credit card 100. As the card 100 is inserted into the terminal 46 the presence of the card is sensed and a credit card transport mechanism draws the card into the terminal 46 and past a read head where the card is sensed for proper orientation and status. If the card is improperly oriented, contains unreadable data, or of a type which cannot be accepted by the terminal 46 it is returned. (If the card is expired it may be retained upon host command.) Assuming a proper credit card, the card 100 is transported past a card reader 102 where the information on the magnetic stripe is read and stored in the random access portion of data storage 66 and the card is detained at a card escrow holding area. The credit card 100 is compatible with standards set forth by the American Bankers Association. This means that the magnetic stripe contains a sequence of five bit words representing a parity bit and four data bits. The four data bits include a start of card (SOC) character, a field separator character and an end of card (EOC) character. Numerals are indicated in binary coded decimal representation. A typical magnetic stripe format begins with a start of card (SOC) character followed by an account number of up to 19 characters, a field separator character, four characters specifying a month and year of the credit card expiration date, a discretionary data field, an end of card (EOC) character and a longitudinal redundancy check character. A maximum of 40-5 bit characters may be recorded on the magnetic stripe. As the characters are read a selection key designated $k1$ which is provided an as initialization option determines a starting point for selecting 8 sequential characters from the magnetic stripe. For example, if $k1$ contains the number 5, the fifth through 13 characters following SOM are selected at step 104 without their parity bits to form 32 bits. These 32 bits are processed in an encryption algorithm 106 to generate 32 bits of encrypted data.

The comparison of part or all of a personal ID number with corresponding credit card information may be selectively provided as a customer option which is indicated at the time of initialization. If the comparison option is not selected the correspondence between ID numbers and credit card information may be randomly selected. However, the execution of a correspondence comparison is then impossible if the terminal 46 operates under control of an off line host. If the local check option is selected, two keys indicate the manner in which the check is executed.

The first check key, $k1$, permits the selection of any contiguous group of eight characters read from the credit card. Key $k1$ identifies the position following SOM of the first of the eight characters. The eight characters would typically, but not necessarily, be chosen to be entirely within the credit card account number field. In the present example $K1 = 5$ causing characters 5–13 to be selected.

The second check key, K2, determines which digits within the personal ID number are to be checked by indicating the digit position at which the check is to begin. Thus, $k2 = 1$ would cause digits 1–6 to be checked, $k2 = 4$ would cause digits 4–6 to be checked and $k2 = 6$ would cause only the least significant digit to be checked as the number of checked digits increases (i.e. $k2$ smaller), the protection against fraud by guessing at ID numbers is increased for off line host operation. However, the locally checked digits must have a predetermined correspondence with credit card information while non-checked digits may have a random correspondence. Increasing the number of locally checked digits thus decreases the number of digits available for random correspondence and increases the opportunity for access to the data base of an on line host in the event that the correspondence algorithm and encryption key becomes compromised. For the present example it is assumed that the customer has exercised his option by selecting the local check feature with $k2 = 4$.

The particular encryption algorithm which determines the correspondence between ID numbers and credit card information is not critical to the practice of this invention except that the relationship between the clear text input and encrypted text output should be independent upon an encryption key designated here the first encryption key, Key A. For the purpose of this example it will be assumed that the encryption algorithm is of the type designated Lucifer in an article, H. Feistel, "Cryptography and Computer Privacy", *Scientific American*, May 1973, pp. 15–23 or in an article, C. H. Meyer, "Enciphering Data for Secure Transmission," *Computer Design*, April 1974, pp. 129–134. An encryption key such as Key A, for the algorithm 106, is a word containing 64 binary digits. The encryption key can also be thought of as including 8—8 bit bytes. Key A is stored within the auxiliary memory portion of operator function subsystem 76 and occupies eight of the 128 memory words therein. In order to provide complete protection for this key, the key is destroyed each time a maintenance function from the customer interface panel is requested. This destruction prevents an ordinary terminal maintenance person from gaining access to the code. In one arrangement a trusted bank employee having access to Key A waits until the maintenance person completes terminal maintenance and then enters the 64 bit code as eight sequentially entered hexadecimal digit pairs. An operator panel hexadecimal display indicates entered digits to permit correction if necessary with only the two most recently entered digits being displayed at any given time. This restriction of the display to two digits protects the security of the key by requiring a person trying to copy the key by observation of the display to observe the display for a considerable period of time by making it impossible to observe the entire key at one instant as the key entry is completed. Once the key is entered it cannot be again displayed. It is thus possible to directly enter key A into the terminal as described above.

However, in an alternate example the trusted bank employee is given not Key A, but a Key A' having a predetermined relationship to Key A. In this example the trusted employee enters Key A' into the terminal in the same manner as if he were entering Key A itself. However, the terminal processes Key A' with an encryption algorithm 108 which may be similar to or even identical to encryption algorithm 106 to produce the encryption Key A. The encryption algorithm 108 uses a second encryption key designated Key C which is a terminal back up key in the encryption process which converts Key A' to Key A. Alternatively, a completely separate key could be loaded at initialization for this purpose.

Because of the predetermined relationship between the 32 bits of credit card data which is encrypted with Key A and the six digit personal ID numbers which are given to a person at a time a card is issued, the security of Key A is extremely important. If a class of credit cards is to be usable at more than one branch of a customer bank, then at least one person at each bank must have access to Key A so that it can be keyed into a terminal 46 when necessary. For a large bank with many branches this distribution can become quite wide. Furthermore, if a card is to be usable interchangably at more than one bank, all banks accepting the card must have the same encryption Key A. The number of persons having access to Key A is thus further increased and can become quite substantial. The use of encryption algorithm 108 provides security against this wide distribution of Key A. By using a different Key C at each banking unit only a predetermined Key A' corresponding to the given Key C will operate satisfactorily to produce the highly important Key A. For example each unit might be a separate branch bank having three or four of the terminals 14. Only the Key A' for that unit or branch bank will satisfactorily produce the Key A. If a person having access to Key A' at one branch goes to a different branch, where a different Key C is employed in the encryption algorithm 108, the Key A' from the first branch will not produce the Key A at the second branch. It is thus possible to limit the distribution of Key A to a very small, highly select group of people.

Encryption algorithm 106 thus produces as an output 32 binary digits having a predetermined relationship to the 32 bit input. These 32 output bits are divided into 6–5 bit words in a table conversion process 110 with only 30 bits being used. For instance, the words may be formed from first six groups of five sequential bits each with the last two bits not being used. Each group of five bits is utilized in table conversion process 110 as an address word in accessing a table storing one decimal digit of value 1–9 at each address location. The table conversion thus results in six digits, each having a value of 1–9. These digits have a direct correspondence to the personal ID number and the digit 0 is excluded in order to avoid personal ID numbers which start with leading 0's and can be expected to create confusion or variable length entries.

If the information on the credit card is found to be in order, a user access panel is opened to provide user access to the optical user display and user keyboard 112. The user is directed to enter his personal ID number through the numeric field of the keyboard. If the user does not enter exactly six digits within a predetermined period of time, an incorrect ID number is assumed and a retry is suggested. Upon entry of exactly six digits, a portion or the whole of the entered ID number is optionally compared with the 6 digit number generated by table conversion 110. The key K2 indicates which of the six corresponding pairs of digits are to be compared.

In this example it has been assumed that K2 = 4 so that the three least significant digits having positions 4, 5 and 6 are compared by compare step 114. If the comparison is invalid, a faulty ID number is indicated and the user is invited to retry entry of the ID number. If the ID number is not properly entered in a given number of retries such as three, the transaction request is terminated and a message is sent to the host. Upon host command the credit card is preferably transported to a retention bin to prevent further use of the credit card in random attempts to match an ID number with a possibly stolen credit card. Alternatively, a credit card may be returned to the user. Upon determination that the compared digits of the keyed ID number match the corresponding digits which were obtained from the credit card, the six digits of the personal ID number are converted to a 32 bit binary code at step 116. In step 116 the first 24 bits are obtained directly from the six entered digits. The last eight bits or one byte is obtained by treating each sequential pair of four bit digits as a single byte and taking the successive "exclusive or" of corresponding bit positions in each of the resulting three bytes to obtain data content of the corresponding bit position in the fourth byte. Other means of obtaining the last eight bits of information are acceptable so long as the method results in variable information which is a function of all bits of the entered ID number. These 32 bits are then processed with an encryption algorithm 118 using Key A to produce a 32 bit encrypted personal ID number. The encryption algorithm 118 may in general be any suitable encryption algorithm, but for this example it will be presumed that it is identical to the encryption algorithm 106. Use of the same algorithm for both encryption processes permit use of the same stored program or hardware logic for both processes. The encryption key for algorithm 118 may also be in general any suitable key. However, for this example it is assumed that algorithm 118 utilizes Key A which is identical to the Key A utilized for algorithm 106. This multiple use of the same encryption key as well as the same encryption algorithm further reduces the complexity of the terminal 46 operation and the size of the required data storage. The 32 bits which result from encryption algorithm 118 thus represent a once encrypted personal ID number.

The 32 bits of the encrypted personal ID number are then converted in step 120 to six four bit digits with two four bit digits being dropped. In step 122 the two discarded digits are replaced by two four bit digits of variable data. This replacement of ID number derived information with variable information prevents the encrypted field from being a constant. In general the variable data may be any data which has no predetermined relationship to the personal ID number and which varies with each transaction request message. In this preferred embodiment, the variable data is a cash counter (CNTR) count for cash issue transactions and a transaction number (N) for other transactions.

The 32 bits which result from the combination of the six four bit digits and the eight bits of variable data are then passed through an encryption algorithm 124 which utilizes a third encryption Key B. Encryption algorithm 124 may in general be any suitable encryption algorithm. But for this preferred embodiment it will be assumed that algorithm 124 is identical to algorithm 118, algorithm 106, and algorithm 108. Key B is a 64 bit encryption key which is received from the host data processing system 12 during initialization and which cannot be changed except by communication of a new key from the host data processing system. The encryption algorithm 124 results in 32 bits of encrypted data which are assembled in a transaction request message immediately behind the four byte common header as described previously.

After the compare step 114 at least partially validates the credit card, the user is instructed to indicate the transaction which he is requesting by use of the keyboard 112. The user is first instructed to indicate the type of transaction which is being requested and all of the back lights in the transaction request field of the keyboard are illuminated. As a particular key, which in this case would be the funds transfer key, is activated, the back light of the activated key remains illuminated while the back lights of all other keys in the field are extinguished. The user is then instructed to select the account from which funds are to be transferred and the back lights of all of the keys in the from account field are illuminated. As the user selects the from savings key the back light of that key remains illuminated while the back lights of all other keys in the from account field are extinguished. The user is then instructed to select the account to which the funds are to be transferred and all back lights in the to account field are illuminated. Upon selection of the checking account key, the activated key remains back lighted and the back lights of all other keys in the to account field are extinguished. The remaining back lights provide an audit trail so that a user may confirm or remind himself of the status of his transaction request entry. He can change his mind at any time by returning to a previously entered field activating a new key and continuing the keyboard entry process from that point. Numerical information such as the dollar amount of funds which are to be transferred is entered through the numeric field of keyboard 112. All entered numeric information is displayed for confirmation except the personal ID number. This number is not displayed in order to prevent surreptitious knowledge of the personal ID number by a person standing behind the user. The keyboard data, credit card data read from the magnetic stripe, and any desired additional data are then provided in clear text behind the four byte common header field and four byte encrypted field. This information is then communicated to the host data processing system 12 as a transaction request message.

2. TRANSACTION REPLY MESSAGE

Referring now to FIG. 4 as a transaction request message is received by the host data processing system 12, it undergoes processing 140 to separate the various fields of data with the common header field being used for message routing and with the 32 encrypted bits being passed through a decrypt algorithm 142 and the clear text being received by the host data processor 144 which has a large data storage 146. The decrypt algorithm 142 uses Key B which is the same as the third or transmission key which was utilized for encryption algorithm 124. The host data processor 144 utilizes the clear text data to access the user's data base record (file) data storage 146. This file contains account data as well as information associated with the user's credit card such as the encrypted personal ID number (or numbers).

The 32 bits which are generated by decryption algorithm 142 are passed through a separation processor 148 wherein the six four bit digits of the encrypted personal ID number are separated from the two variable digits. A comparison 150 is then performed with the communicated six digits of the encrypted ID number being compared with the six digits of ID information from the file which were stored in encrypted form.

This encryption process greatly improves the security of cash stored in the various transaction terminals 14 which may be in communication with an on line host data processing system. A person of ill intent who is in possession of the correspondence between credit card account numbers and personal ID numbers could surreptitiously obtain cash from a terminal 14. For example, a person might forge or steal credit cards having information stored thereon which pertains to actual user accounts. Using the forged credit card and the corresponding personal ID number, a person could first inquire as to the balance of various savings, checking or other accounts which are accessible through the credit card. Having obtained the balance information, the person could then use the credit card and the cash issue terminal 14 to withdraw cash from those accounts until either the accounts or the terminal cash are depleted. Additional accounts with their credit card and corresponding personal ID number could be utilized in a similar manner until all of the cash at a cash issue terminal has been issued. The person could then move on to deplete the cash from additional cash issue terminals in the system using additional credit cards and personal ID numbers. Because each cash terminal 14 may contain many thousands of dollars and because there may be many terminals 14 in communication with the host data processing system 12, it becomes extremely important to maintain the correspondence between credit card account numbers and personal ID numbers secured and yet permit local checks to allow higher availability of terminals 14 through off line use. It becomes extremely difficult for a person to obtain the correspondence between the credit card information and personal ID numbers for a large number of accounts when the techniques described herein are employed. Even if the personal ID number may be completely generated by passage of the stored credit card information through encryption algorithm 106, security of its encryption Key A is maintained as described above.

If the relationship of a portion (or preferrably all), for example the first three digits, of the personal ID number and the stored credit card information has no predetermined relation, it becomes even more difficult to compromise the system. It is possible that personnel at the data processing center for the host data processing system 12 may have access to the stored encrypted ID number. However, the actual personal ID number is not stored in the host data processing system and the encrypted ID number is of no value in obtaining cash from a terminal 14 since it is the actual personal ID number that must be entered through the keyboard of a terminal 14. It is thus necessary for a person seeking to obtain the correspondence between a large number of credit cards and corresponding personal ID numbers to have access to both the encrypted personal ID numbers stored in the host data base and the decryption algorithm corresponding to encryption algorithm 118 and encryption Key A.

As credit cards are issued it is possible to limit the knowledge of the correspondence between credit card data and personal ID numbers to a very few people. In fact, accounts can be established with part of the personal ID number being derived from the credit card information, and part being randomly generated by a computer. The total personal ID number can then be printed and sealed in an envelope along with a credit card such that the personal ID number is available to human eyes only after the envelope is given to a prospective user as he opens a credit card account which can be processed by a terminal 14. It is thus possible to develop an assignment system wherein no banking personnel have access to the correspondence between credit card accounts and the associated personal ID number.

If the comparison 150 shows that the stored and communicated encrypted personal ID numbers are not identical, the host data processing system assembles and communicates a transaction reply message indicating that execution of the transaction is not authorized. The transaction reply message might direct the requesting terminal 46 to either retain or return the user credit card. On the other hand, if the stored and communicated encrypted ID numbers are found to correspond, and if the requested transaction does not violate any predetermined rules which might relate to dollar amounts, rates of withdraw, or account balances, the transaction is authorized by a transaction reply message. The transaction reply message contains 32 bits of encrypted information corresponding to the 32 bits of encrypted information which are received in the transaction request message. In an assembling process 152, 32 bits are assembled for encryption with encryption algorithm 154 using Key B, which is the third, transmission encryption key. The encryption algorithm may in general be any suitable encryption algorithm but for this example it is assumed that the algorithm is identical to encryption algorithms 106, 118 and 124. It is further assumed that Key B is identical to the Key B for encryption algorithm 124. The 32 bits which are assembled for encryption are different from the communicated 32 bits which contained the six digits of encrypted ID number and two variable digits. The 32 bits of the transaction reply message include a one byte cash counter number corresponding to a first cash count (CNTR 1) maintained by the terminal 46 which is incremented for each bill issued, an action byte which indicates the response the terminal 14 is to take to the requested user transaction, a second cash counter byte (CNTR 2) identifying the cash count which is maintained for a second cash issue mechanism within the terminal 14 and an amount byte (AMT) which indicates the number of bills which is relevant to the requested transaction. These 32 bits are then processed through encryption algorithm 154 to form 32 encrypted bits 156. The encrypted bits 156 are then combined with clear text data such as optional display data, optional receipt data, or additional data required to complete the transaction and communicated back to the requesting terminal 46 as a transaction reply message in step 158.

3. EXECUTION AND STATUS MESSAGE

As the transaction reply message is received by the terminal 46 the message undergoes input processing 160 to check for transmission accuracy and separate the reply message into its various fields. The encrypted field is passed through a decryption algorithm 162 which uses Key B to restore the 32 bits containing the cash counter one (CNTR 1), ACTION, cash counter two (CNTR 2) and amount data (AMT) as indicated at step 163. These bytes are checked for accuracy to ensure that the transaction reply message was received error free and that it corresponds to the correct transaction request message. A transaction conclusion 164 is then executed in accordance with the contents of the transaction reply message. In concluding a transaction, the terminal 46 returns or retains the credit card, issues appropriate documents such as cash or printed transaction statements, formally executes or cancels the transaction, displays appropriate messages to allow the user's approval or disapproval; and performs any additional transaction execution functions which are necessary for completion of the transaction.

Upon completion of a user requested transaction, the terminal 46 communicates a status message to the host data processor 144 which informs the data processor 144 of the manner in which the requested transaction was terminated and the status of the terminal 46. Preparation of the status message includes assembly 166 of 32 bits which are encrypted with encrypted algorithm 168 using Key B to generate 32 encrypted bits 170. The encryption algorithm 168 may in general be any suitable encryption algorithm but for the preferred embodiment presented herein, encryption algorithm 168 is identical to encryption algorithms 106, 108, 118, 124, and 154. Key B is identical to Key B for encryption algorithms 124 and 154. However, unlike Key A, Key B may be changed by the host data processor 144 and it is anticipated that Key B would be changed from time to time. The 32 bits 170 undergo output processing 172 as they are combined with non-encrypted status information and transmitted as a status message from the transaction execution terminal 46 to the host data processor 144.

The method of using encryption algorithms as described herein provides great security for the transaction execution system 10 without requiring the storage capacity for storing the multiple encryption programs. Furthermore, with the proper selection of the encryption and decryption algorithms, the decryption algorithm can be quite similar to the encryption algorithm to permit a double usage of most of the encryption algorithm program for both encryption and decryption. This results in a further savings of program storage requirements. The last encryption of the 32 bits of encrypted information in the three user transaction messages permits security of the encrypted ID number along the communication channel while permitting the same general format to be utilized for all three messages. In the transaction request message, assembly process 122 combines the encrypted ID number with varying data to make it extremely difficult for a person monitoring the communication lines to break Key B and encryption algorithm 124 by repeatedly entering the same ID number, credit card and request and monitoring the corresponding encrypted communications. The transaction reply message contains a counter one byte, an action byte, a counter two byte and an amount. This information is all different from the encoded information of the transaction request message and also contains varying information. The amount and the action byte will tend to be the same for the same types of transaction request, however the control bytes will change. The 32 encrypted bits of the status message are different from the encrypted fields of either of the other two messages in that they contain the transaction number which is time varying, the counter two and counter one bytes in different byte positions from the transaction reply message and a count byte (CB) which indicates (via a binary count) the number of status and inquiry data bytes which follow the encrypted portion of the message for a normal status message. A status message which is generated in response to a transaction termination would normally contain no inquiry data byte. In the event that the status message is a "request recovery" type of exception status message, the third byte (CB) of the encryption field contains the "action" byte from the transaction reply message for the last request. Thus, by changing Key B from time to time and sending different information in the encrypted portion of each different type of message, the task of breaking the transmission encryption algorithm and finding the current Key B by monitoring the communication lines is made extremely difficult. Even if the transmission encryption algorithm and Key B were broken, monitoring the transmission of messages would produce a correspondence between accounts and encrypted personal ID numbers only for specific credit cards which are used while the communication is being monitored. The assembly of a large number of forged or stolen credit cards and corresponding personal ID numbers could be accomplished only by further breaking the Key A. In an alternative embodiment where there is a predetermined relationship between all digits of the personal ID number and information on the credit card, access to the data base is not necessary. Keys K1 and K2 of course provide further security for the encrypted ID number in the event that the local ID check option is implemented.

While there have been described above various arrangements of transaction execution systems in accordance with the invention for the purpose of illustrating the manner in which the invention may be used to advantage, it will be appreciated that the invention is not limited thereto. Accordingly, any modification, variation or equivalent arrangement within the scope of the accompanying claims should be considered to be within the scope of invention.

What is claimed is:

1. A transaction terminal which is connectable to a host and which is dependent upon a host for approval and recordation of transactions indicated by a user, the transaction terminal comprising:
   a data input device for entering a user determined block of identification information;
   an encoder connected to encode at least a portion of the block of identification information to produce a first encrypted block of identification information indicative of at least a portion of the identification block of information;
   an encoder connected to encode at least a portion of the first encrypted block of identification information to produce a second encrypted block of identification information indicative of at least a portion of the identification block of information; and
   a transmitting system connected to transmit at least a portion of the second encrypted block of identification information to a host.

2. The transaction terminal as set forth in claim 1 above, further comprising a device for generating a block of variable information which changes with each user transaction and wherein the second encrypted block producing encoder is further connected to encode a block of variable information along with the at least a portion of the first encrypted block of identification information to produce a second encrypted block of identification information indicative of both variable information and at least a portion of the block of identification information.

3. The transaction terminal as set forth in claim 1 above, further comprising means for storing first and second encryption keys and wherein the first and second encoded blocks of information are produced in response to the first and second encryption keys respectively.

4. The transaction terminal as set forth in claim 3 above, further comprising an operator control panel for entering operator determined information;
   means responsive to the entry of control information through the operator panel for destroying the first encryption key; and
   an encoder connected to produce and store the first encryption key in response to the entry of proper operator determined information through the contol panel.

5. The transaction terminal as set forth in claim 4 above, further comprising means for storing a third encryption key and wherein the first encryption key is produced in response to a stored third encryption key and information entered through the contol panel.

6. The transaction terminal as set forth in claim 1 above, wherein the block of identification information is of a length less than a predetermined length and further comprising means for expanding a data block length connected to receive a short data block of a length less than a predetermined length from the data input device, expand the received data block to a predetermined length by adding characters which are dependent upon the data content of the short data block, and provide a data block which has been expanded to a predetermined length to the first encrypted block producing encoder.

7. The transaction terminal as set forth in claim 6 above, wherein the expanding means expands a short block of data by adding characters which are generated from the process of taking the logical exclusive-or of selected portions of the short block of data.

8. The transaction terminal as set forth in claim 1 above, further comprising means for reading prerecorded information from a user produced card, an encoder connected to encode a selected portion of the prerecorded information read from a card to produce a block of encrypted card information, and a comparator connected to compare a selected portion of the block of identification information received by the data input device with a corresponding selected portion of the block of encrypted card information and indicate the identity or non-identity of the compared data.

9. The transaction terminal set forth in claim 8 above, further comprising means responsive to the identity or nonidentity indication for inhibiting the transmission of said at least a portion of the second encrypted block to a host.

10. The transaction terminal as set forth in claim 8 above, further comprising means for selecting a portion of the prerecorded card information for encoding in response to a predetermined encryption key.

11. The transaction terminal as set forth in claim 8 above, further comprising means for selecting a portion of the block of identification information and block of encrypted card information which are to be compared in response to a predetermined encryption key.

12. A transaction execution system having a host data processing system maintaining a plurality of accounts and which approves or disapproves requested transactions affecting the maintained accounts and modifies maintained accounts in accordance with approved requested transactions which affect said accounts, the transaction execution system comprising:

a host data processing system including a data base store storing a plurality of accounts, each including a first block of information and a second block of information which has a relationship to a third block of information of being obtainable by encrypting a third block of information in accordance with a first predetermined coding scheme, the host data processing system approving a requested transaction and correspondingly modifying a related information block containing account only when both the first and second blocks of information for an account which is related to a requested transaction are included as part of a transaction request received by the host; and at least one transaction execution terminal coupled in communication with the host data processing system, the terminal including means for receiving transaction request information from a user along with first and third blocks of information for an adversely affected account, the terminal including means for encrypting the third block of information in accordance with the first predetermined encoding scheme to obtain a second block of information and means for communicating the transaction information, first block of information and second block of information to the host data processing system.

13. The transaction execution system as set forth in claim 12 above, wherein the transaction execution terminal includes means for issuing cash to a user in response to a cash issue transaction request which is approved by the host upon receipt by the terminal of a host approval indication, and wherein the host data processing system communicates a cash issue transaction approval indication to the terminal in response to the receipt from the terminal of cash issue transaction request information and first and second blocks of information only if predetermined conditions are met, said predetermined conditions including a predetermined correspondence between the second block of information received by the host data processing system from the terminal and information stored by the host data processing system in an account indicated by the first block of information received by the host data processing system from the terminal.

14. The transaction execution system as set forth in claim 13 above, wherein the terminal includes means for reading information from a user supplied card which indicates a user account within the plurality of accounts maintained by the host data processing system.

15. The transaction execution system as set forth in claim 14 above, wherein the third block of information is obtainable by encrypting the first block of information in accordance with a second predetermined encoding scheme.

16. The transaction execution system as set forth in claim 15 above, wherein the first and second predetermined encoding schemes are the same.

17. The transaction execution system as set forth in claim 12 above, wherein the terminal includes means for reading the first block of information from a user supplied card.

18. The transaction execution system as set forth in claim 17 above, wherein the third block of information has the relationship to the first block of information of being obtainable by encrypting the first block of information in accordance with a second predetermined encoding scheme.

19. The transaction execution system as set forth in claim 18 above, wherein the first and second predetermined encoding schemes are the same.

20. A transaction execution system comprising:

a host data processing system storing information for a plurality of accounts, said information including a first information block and a second information block, the host system operating (1) to receive first messages from at least one terminal, each first message containing first and second data blocks and transaction request information, (2) to access a stored second block of information for an account which includes the first block of information and compare the received second block of information with the accessed stored second block of information, (3) to communicate a second message to a terminal which indicates disapproval of a requested transaction unless the received second block of information is the same as the accessed stored second block of information, (4) to receive a third message from a terminal which indicates that a requested transaction has been executed by the terminal, and (5) to update stored information for an account which is affected by an executed transaction in response to the receipt of a third message indicating that a requested transaction has been executed; and a transaction execution terminal coupled for communication with the host data processing system and which includes (1) means for receiving a first information block, a third information block and transaction request information from a terminal user, (2) means for processing the third information block in accordance with a predetermined algorithm to generate a second information block in response to the third information block, (3) means for communicating to the host data processing system a first message containing the received first data block, the generated second data block and the received transaction request information, (4) means for receiving a second message from the host data processing system, (5) means for responding to a second message that does not disapprove a requested transaction by executing a requested transaction, and (6) means for communicating a third message to the host data processing system which indicates that a requested transaction has been executed in response to the execution of a requested transaction.

21. The transaction execution system as set forth in claim 20 above wherein the transaction execution terminal further includes means for combining the generated second data block with information which varies with each transaction, means for encrypting the combined data to generate a fourth data block, and means for communicating the fourth block of information as part of the first message with the generated second block of information being contained in the first message only as part of the fourth block of information, and wherein the host data processing system decrypts the fourth block of information contained within a first message to derive the second block of information.

22. A transaction execution system comprising a host data processing system storing a data base of accounts each having account identification information and corresponding user identification information but no identification number information included therein, at least a portion of the corresponding user authentication information having a randomly selected relationship to the account identification information, the host data processing system approving a transaction request from a transaction terminal only when the transaction request includes account identification information and authentication information corresponding thereto; and a transaction terminal including means for receiving account identification information, an identification number and transaction request information from a terminal user, means for generating authentication information having a predetermined relationship to the identification number and means for communicating the received account information, transaction request information and generated authentication information but not the identification number to the host.

23. The transaction execution system as set forth in claim 22 above, wherein the host data processing system includes means for communicating to a terminal information indicating the approval or disapproval of a transaction request received by the host system from the terminal and means for accounting for a requested transaction by modifying stored accounts in accordance therewith upon receipt by the host system of a message from the terminal which indicates that a requested transaction has been executed, and wherein the transaction terminal further includes means for receiving an approval or disapproval indication for a requested transaction from the host system, means for executing an approved requested transaction in response to the receipt of an approval indication and means for communicating to the host system a message which indicates that a requested transaction has been executed in response to the execution of a requested transaction.

24. A transaction execution system comprising a transaction execution terminal including means for receiving account identification information, ID information and transaction request information from a terminal user, at least a portion of the ID information having a predetermined relationship to the account information, the terminal further including means for processing the received account information in accordance with the predetermined relationship to generate ID information, means for comparing the generated ID information with the received ID information, means for disapproving a requested transaction if said at least a portion of the received ID information is not the same as a corresponding portion of the generated ID information, means for generating authentication information having a predetermined relationship to, but different from, information received from a terminal user, and means for communicating account ID information, transaction request information and authentication information to a host data processing system having a stored data base of accounts when a requested transaction is not disapproved by the disapproving means.

25. A self service banking terminal comprising:
first means for receiving and storing a secret cypher key indicated by bank personnel;
card reader means for reading information encoded on a user card;
second means for receiving information manually entered by a user;
cryptographic means operating in dependence upon said secret cypher key for detecting noncorrespondence between predetermined portions of said read information and predetermined portions of said manually entered information;
third means operable by service personnel for diagnosing machine malfunctions;
means for erasing said secret cypher key from said receiving and storing means when said third means is made operable; and
means for inhibiting the execution of a requested transaction upon detection of a noncorrespondence by the cryptographic means.

26. A system for conducting business transactions comprising:
first and second stations separated from each other, and linked together by a communication link interconnecting said stations;
said first station including
card reader means for reading data encoded in an identification card presented to said first station by a user;
first keyboard means operable in a plurality of modes for receiving manually selected data, including in a first mode a secret number having a cryptographic relationship to selected data encoded in said identification card, and in a second mode a transaction amount;
second keyboard means for generating signals identifying one of a plurality of business transactions, including cash withdrawal;
a display connected to display selected information to a user;
dispensing means for issuing currency in response to an authorization message from said second station;
means for counting the number of documents issued by said dispensing means;

means for printing selected information on a statement and issuing a printed statement to a user;

request message generating means in said first station operable in response to said card reader means and said first and second keyboard means for transmitting to said second station a request message including an encyphered portion and a clear data portion, said encyphered portion comprising a cypher message obtained by encrypting a data word including the secret number entered by said customer and the contents of said counting means, the clear text data including information read from said card and information identifying the number of currency documents requested;

said second station comprising means operable in response to said request message for generating a reply message, said reply message including an encyphered portion and a clear data portion, said encyphered portion comprising a cypher message obtained by encrypting a second data word including a plurality of status bits for instructing said first station to return or retain said card, to authorize or reject the requested transaction, and also including a character identifying the number of currency documents to be issued and the cumulative number of bills issued by said dispensing means, and the clear text portion containing data identifying information to be displayed on said display means and printed by said printing means;

said first station further comprising means for decyphering the encyphered portion of said reply message and for controlling said dispensing to issue the requested number of bills based upon the existence of a transaction approval status bit in said reply message and correspondence between the amount requested and the amount authorized, and correspondence between the contents of said cash counter and a number obtained from said reply message identifying the number of bills issued.

27. A transaction execution system which is operable to execute transactions requested by a user having a credit card with information stored thereon and a personal ID number, the transaction execution system comprising a host data processing system including means for storing account information which is accessible in response to information stored on a user credit card, said account information including an encrypted ID number generated by encryption of the personal ID number of the user in a predetermined manner, the host data processing system including means for authenticating the user credit card by comparing the stored encrypted ID number with a communicated encrypted ID number received from a transaction request terminal; and at least one transaction request terminal in communication with the host data processing system, the transaction request terminal including means for receiving a user credit card, means for reading information stored on the credit card, means for receiving independent of the credit card a personal ID number, means for encrypting the personal ID number in accordance with the same predetermined manner used for generation of the stored encrypted ID number, and means for communicating the encrypted ID number and information read from the credit card to the host data processing system.

28. The method of operating a transaction execution system having a host data processing system storing account information for a plurality of accounts and at least one transaction terminal in communication with the host system, the terminal being capable of encrypting ID information received thereby, the method comprising the steps of:

storing encrypted ID information with each account;

communicating transaction information, ID information and account identification information from a system user to the transaction terminal;

encrypting ID information received by the terminal from a user;

communicating transaction information, encrypted ID information and account identification information from the terminal to the host system; and executing a transaction indicated by the transaction information only if the communicated encrypted ID information corresponds to encrypted ID information stored with an account indicated by the account identification information.

* * * * *

UNITED STATES PATENT OFFICE
CERTIFICATE OF CORRECTION

Patent No. 3,956,615  Dated May 11, 1976

Inventor(s) Thomas G. Anderson et al

It is certified that error appears in the above-identified patent and that said Letters Patent are hereby corrected as shown below:

Column 34, line 47, "tol" should read --trol--; line 52, "contol" should read --control--.

Signed and Sealed this

Twentieth Day of July 1976

[SEAL]

Attest:

RUTH C. MASON
*Attesting Officer*

C. MARSHALL DANN
*Commissioner of Patents and Trademarks*